United States Patent [19]
Terry et al.

[11] Patent Number: 6,125,374
[45] Date of Patent: Sep. 26, 2000

[54] INTERACTIVE GRAPHIC PROCESSING SYSTEM FOR PACKAGES AND LABELS

[75] Inventors: James P. Terry, Metuchen; Richard B. Gerstman, Tenafly, both of N.J.

[73] Assignee: Gerstman + Meyers, Inc., New York, N.Y.

[21] Appl. No.: 08/794,187

[22] Filed: Feb. 3, 1997

[51] Int. Cl.[7] .................................................. G06F 17/30
[52] U.S. Cl. ........................................................ 707/502
[58] Field of Search ............................ 707/502; 345/425, 345/435, 430, 441, 964

[56] References Cited

U.S. PATENT DOCUMENTS

| | | | |
|---|---|---|---|
| 4,796,201 | 1/1989 | Wake | 345/430 |
| 4,873,643 | 10/1989 | Powell et al. . | |
| 5,099,422 | 3/1992 | Foresman et al. . | |
| 5,109,479 | 4/1992 | Williams | 395/125 |
| 5,255,207 | 10/1993 | Cornwell . | |
| 5,274,751 | 12/1993 | Rosenberg . | |
| 5,357,439 | 10/1994 | Matsuzaki et al. . | |
| 5,379,368 | 1/1995 | Imai et al. . | |
| 5,444,836 | 8/1995 | Hollingsworth et al. . | |
| 5,459,819 | 10/1995 | Watkins et al. . | |
| 5,459,826 | 10/1995 | Archibald . | |
| 5,530,793 | 6/1996 | Watkins et al. . | |
| 5,621,864 | 4/1997 | Benade et al. | 395/117 |

OTHER PUBLICATIONS

Holzberg, Carol S., "Adobe(TM) goes home with Paint and Publish Deluxe", Computer Shopper, vol. 15, No. 6, p. 520, Jun. 1995.
Ziff Davis Publishing, "MySoftware launches low–end label app.", MacWeek, vol. 6, No. 41, pg. 6, Nov. 1992.
Shapiro, Neil, "MacLabelPro sticks to basics", MacWeek, vol. 6, No. 12, p. 46, Mar. 1992.
Pogue, David, "Peel–n–Stick Nirvana", Macworld, vol. 9, No. 5, p. 199(2), May 1992.
Gerstman + Meyers Inc. IBIS brochure, 4 pages (1993).

*Primary Examiner*—Joseph H. Feild
*Assistant Examiner*—Robert D. Bourque
*Attorney, Agent, or Firm*—George H. Gerstman; Seyfarth, Shaw

[57] ABSTRACT

A method for applying graphics to packaging and/or labels using an interactive computer operated by a user. A database containing predesigned graphics is provided and stored. A drawing program is stored in the computer. The method includes a template selector which is user-operated to automatically select the predesigned graphics from the database. The selected predesigned graphics are launched into the drawing program and the drawing program is user-operated to manipulate the graphics.

12 Claims, 24 Drawing Sheets

| TopicCode | SubjectName | SubjectCat | SubjectListOrder | TxtFile | BmpFile | CdrFile | Author | Date | Description |
|---|---|---|---|---|---|---|---|---|---|
| GUI | Trilingual Design Elements | TRI | 1 | gui_tde.txt | gui_tde.bmp | None | | | |
| GUI | Unilingual Design Elements | UNI | 2 | gui_ude.txt | gui_ude.bmp | None | | | |
| GUI | Standard Design Elements | STD | 3 | gui_sde.txt | gui_sde.bmp | None | | | |
| GUI | Brand Mark | ALL | 4 | gui_bm.txt | gui_bm.bmp | None | | | |
| GUI | Color Standards | ALL | 5 | gui_cs.txt | gui_cs.bmp | None | | | |
| GUI | Typography | ALL | 6 | gui_t.txt | gui_t.bmp | None | | | |
| GUI | Brand Mark Size and Placement | ALL | 7 | gui_bmsp.txt | gui_bmsp.bm | None | | | |
| GUI | Repeat Pattern Size | ALL | 8 | gui_rpsp.txt | gui_rpsp.bmp | None | | | |
| GUI | Repeat Pattern Samples | ALL | 9 | gui_rps.txt | gui_rps.bmp | None | | | |
| GUI | Tri Product Name Samples | TRI | 10 | gui_tpns.txt | gui_tpns.bmp | None | | | |
| GUI | Uni Product Name Samples | UNI | 11 | gui_upns.txt | gui_upns.bmp | None | | | |
| GUI | Keyline Samples | UNI | 12 | gui_ks.txt | gui_ks.bmp | None | | | |
| GUI | Divider Rules Samples | TRI | 13 | gui_drs.txt | gui_drs.bmp | None | | | |
| GUI | Color Bar Size and Placement | ALL | 14 | gui_cbsp.txt | gui_cbsp.bmp | None | | | |
| GUI | Part Number & Bar | ALL | 15 | gui_pnbp.txt | gui_pnbp.bm | None | | | |
| GUI | Carton Classification | ALL | 16 | gui_cc.txt | gui_cc.bmp | None | | | |
| GUI | Improper Usage | ALL | 17 | gui_iu.txt | gui_iu.bmp | None | | | |
| MSC | Die Formatter | ALL | 1 | None | None | msc_df.cdr | | | |
| MSC | Back Panel Elements | ALL | 2 | None | None | msc_bpe.cdr | | | |
| PRO | Clam Shell Inserts | PRO | 8 | pro_csi.txt | pro_csi.bmp | pro_csi.cdr | IBIS | 10/1/96 | Shown here is |
| PRO | Spark Plug (Int. Master Ctn.) | PRO | 17 | pro_spim.txt | pro_spim.bm | pro_spim.cdr | IBIS | 10/1/96 | Shown here is |
| PRO | Spark Plug Sleeve (8 Pk-B size) | PRO | 22 | pro_sosB.tx | pro_sosB.bm | pro_sosB.cd | IBIS | 10/1/96 | Shown here is |
| PRO | Spark Plug Sleeve (Ext. 8 Pack) | PRO | 23 | pro_spsB.txt | pro_spsB.bm | pro_spsB.cdr | IBIS | 10/1/96 | Shown here is |
| PRO | Standard Carton A | PRO | 25 | pro_stdA.txt | pro_stdA.bmp | pro_stdA.cdr | IBIS | 10/1/96 | Shown here is |
| PRO | Standard Carton B | PRO | 26 | pro_stdB.txt | pro_stdB.bmp | pro_stdB.cdr | IBIS | 10/1/96 | Shown here is |
| PRO | Standard Carton C | PRO | 27 | pro_stdC.txt | pro_stdC.bmp | pro_stdC.cdr | IBIS | 10/1/96 | Shown here is |
| PRO | Tri-Ctn. Oxygen Sensor | PRO | 39 | pro_triA.txt | pro_triA.bmp | pro_triA.cdr | IBIS | 10/1/96 | Shown here is |
| PRO | Spark Plug Sleeve (Imprinting) | PRO | 24 | pro_sosi.txt | pro_sosi.bmp | pro_sosi.cdr | IBIS | 10/1/96 | Shown here is |
| PRO | Tri-Ctn. Air Filter A.1 | PRO | 32 | pro_triB.txt | pro_triB.bmp | pro_triB.cdr | IBIS | 10/1/96 | Shown here is |
| PRO | Tri-Ctn. Air Filter A.2 | PRO | 33 | pro_triC.txt | pro_triC.bmp | pro_triC.cdr | IBIS | 10/1/96 | Shown here is |
| PRO | Tri-Ctn. Air Filter A.3 | PRO | 34 | pro_triD.txt | pro_triD.bmp | pro_triD.cdr | IBIS | 10/1/96 | Shown here is |
| PRO | Tri-Ctn. Air Filter A.4 | PRO | 35 | pro_triE.txt | pro_triE.bmp | pro_triE.cdr | IBIS | 10/1/96 | Shown here is |
| PRO | Tri-Ctn. Air Filter A.5 | PRO | 36 | pro_triF.txt | pro_triF.bmp | pro_triF.cdr | IBIS | 10/1/96 | Shown here is |
| PRO | Tri-Ctn. Air Filter B | PRO | 37 | pro_afb.txt | pro_afb.bmp | pro_afb.cdr | IBIS | 10/1/96 | Shown here is |
| PRO | Tri-Ctn. Air Filter C | PRO | 38 | pro_afc.txt | pro_afc.bmp | pro_afc.cdr | IBIS | 10/1/96 | Shown here is |
| SPT | Plastic Bag | SPT | 16 | spt_plas.txt | spt_plas.bmp | spt_plas.cdr | IBIS | 10/1/96 | Shown here is |
| SPT | Standard Repeat Pattern A | SPT | 30 | spt_srpa.txt | spt_srpa.bmp | spt_srpa.cdr | IBIS | 10/1/96 | Shown here is |
| SPT | Standard Repeat Pattern B | SPT | 31 | spt_srpb.txt | spt_srpb.bmp | spt_srpb.cdr | IBIS | 10/1/96 | Shown here is |
| SPT | Blister Pack A | SPT | 1 | spt_bpA.txt | spt_bpA.bmp | spt_bpA.cdr | IBIS | 10/1/96 | Shown here is |
| SPT | Blister Pack B | SPT | 2 | spt_bpB.txt | spt_bpB.bmp | spt_bpB.cdr | IBIS | 10/1/96 | Shown here is |
| SPT | Blister Pack C | SPT | 3 | spt_bpC.txt | spt_bpC.bmp | spt_bpC.cdr | IBIS | 10/1/96 | Shown here is |
| SPT | Blister Pack D | SPT | 4 | spt_bpD.txt | spt_bpD.bmp | spt_bpD.cdr | IBIS | 10/1/96 | Shown here is |
| SPT | Blister Pack E | SPT | 5 | spt_bpe.txt | spt_bpe.bmp | spt_bpe.cdr | IBIS | 10/1/96 | Shown here is |
| SPT | Bottle Labels | SPT | 6 | spt_botl.txt | spt_botl.bmp | spt_botl.cdr | IBIS | 10/1/96 | Shown here is |
| SPT | Can Wraparound | SPT | 7 | spt_canw.tx | spt_canw.bm | spt_canw.cd | IBIS | 10/1/96 | Shown here is |
| SPT | Label A | SPT | 13 | spt_lblA.txt | spt_lblA.bmp | spt_lblA.cdr | IBIS | 10/1/96 | Shown here is |
| SPT | Label B | SPT | 14 | spt_lblB.txt | spt_lblB.bmp | spt_lblB.cdr | IBIS | 10/1/96 | Shown here is |
| SPT | Label C | SPT | 15 | spt_lblC.txt | spt_lblC.bmp | spt_lblC.cdr | IBIS | 10/1/96 | Shown here is |
| SPT | Corr. Carton (int.) | SPT | 9 | spt_cci.txt | spt_cci.bmp | spt_cci.cdr | IBIS | 10/1/96 | Shown here is |
| SPT | Corr. Carton (large) | SPT | 10 | spt_ccl.txt | spt_ccl.bmp | spt_ccl.cdr | IBIS | 10/1/96 | Shown here is |
| SPT | Corr. Carton (small) | SPT | 11 | spt_ccs.txt | spt_ccs.bmp | spt_ccs.cdr | IBIS | 10/1/96 | Shown here is |
| SPT | Engine Sleeve | SPT | 12 | spt_engs.txt | spt_engs.bm | spt_engs.cdr | IBIS | 10/1/96 | Shown here is |
| SPT | Standard Label B | SPT | 29 | spt_slbB.txt | spt_slbB.bmp | spt_slbB.cdr | IBIS | 10/1/96 | Shown here is |
| SPT | Spark Plug (Reg. Master Ctn.) | SPT | 18 | spt_sprm.txt | spt_sprm.bm | spt_sprm.cdr | IBIS | 10/1/96 | Shown here is |
| SPT | Spark Plug Blister (4 PK) | SPT | 19 | spt_4PkS.tx | spt_4PkS.bm | spt_4PkS.cd | IBIS | 10/1/96 | Shown here is |
| SPT | Spark Plug Blister (6 PK) | SPT | 20 | spt_6PkS.tx | spt_6PkS.bm | spt_6PkS.cd | IBIS | 10/1/96 | Shown here is |
| SPT | Spark Plug Blister (Single) | SPT | 21 | spt_spbs.txt | spt_spbs.bmp | spt_spbs.cdr | IBIS | 10/1/96 | Shown here is |
| SPT | Standard Label A | SPT | 28 | spt_slpa.txt | spt_slpa.bmp | spt_slpa.cdr | IBIS | 10/1/96 | Shown here is |
| STS | Standard Template Shape A1 | STD | 1 | None | None | std_A1.cmx | | | |
| STS | Standard Template Shape A2 | STD | 2 | None | None | std_A2.cmx | | | |
| STS | Standard Template Shape A3 | STD | 3 | None | None | std_A3.cmx | | | |
| STS | Standard Template Shape A4 | STD | 4 | None | None | std_A4.cmx | | | |
| STS | Standard Template Shape A5 | STD | 5 | None | None | std_A5.cmx | | | |
| STS | Standard Template Shape A6 | STD | 6 | None | None | std_A6.cmx | | | |
| STS | Standard Template Shape A7 | STD | 7 | None | None | std_A7.cmx | | | |
| STS | Standard Template Shape A8 | STD | 8 | None | None | std_A8.cmx | | | |
| STS | Standard Template Shape A9 | STD | 9 | None | None | std_A9.cmx | | | |
| STS | Standard Template Shape B1 | STD | 10 | None | None | std_B1.cmx | | | |
| STS | Standard Template Shape B2 | STD | 11 | None | None | std_B2.cmx | | | |
| STS | Standard Template Shape B3 | STD | 12 | None | None | std_B3.cmx | | | |
| STS | Standard Template Shape B4 | STD | 13 | None | None | std_B4.cmx | | | |
| STS | Standard Template Shape B5 | STD | 14 | None | None | std_B5.cmx | | | |
| STS | Standard Template Shape B6 | STD | 15 | None | None | std_B6.cmx | | | |
| STS | Standard Template Shape B7 | STD | 16 | None | None | std_B7.cmx | | | |
| STS | Standard Template Shape B8 | STD | 17 | None | None | std_B8.cmx | | | |
| STS | Standard Template Shape B9 | STD | 18 | None | None | std_B9.cmx | | | |
| STS | Standard Template Shape C1 | STD | 19 | None | None | std_C1.cmx | | | |
| STS | Standard Template Shape C2 | STD | 20 | None | None | std_C2.cmx | | | |
| STS | Standard Template Shape C3 | STD | 21 | None | None | std_C3.cmx | | | |
| STS | Standard Template Shape C4 | STD | 22 | None | None | std_C4.cmx | | | |
| STS | Standard Template Shape C5 | STD | 23 | None | None | std_C5.cmx | | | |

FIG. 33A

| TopicCode | SubjectName | SubjectCat | SubjectListOrder | TxtFile | BmpFile | CdrFile | Author | Date | Description |
|---|---|---|---|---|---|---|---|---|---|
| STS | Standard Template Shape C6 | STD | 24 | None | None | std_C6.cmx | | | |
| STS | Standard Template Shape C7 | STD | 25 | None | None | std_C7.cmx | | | |
| STS | Standard Template Shape C8 | STD | 26 | None | None | std_C8.cmx | | | |
| STS | Standard Template Shape C9 | STD | 27 | None | None | std_C9.cmx | | | |
| STS | Standard Template Shape D1 | STD | 28 | None | None | std_D1.cmx | | | |
| STS | Standard Template Shape D2 | STD | 29 | None | None | std_D2.cmx | | | |
| STS | Standard Template Shape D3 | STD | 30 | None | None | std_D3.cmx | | | |
| STS | Standard Template Shape D4 | STD | 31 | None | None | std_D4.cmx | | | |
| STS | Standard Template Shape D5 | STD | 32 | None | None | std_D5.cmx | | | |
| STS | Standard Template Shape D6 | STD | 33 | None | None | std_D6.cmx | | | |
| STS | Standard Template Shape D7 | STD | 34 | None | None | std_D7.cmx | | | |
| STS | Standard Template Shape D8 | STD | 35 | None | None | std_D8.cmx | | | |
| STS | Standard Template Shape D9 | STD | 36 | None | None | std_D9.cmx | | | |
| STS | Standard Template Shape E1 | STD | 37 | None | None | std_E1.cmx | | | |
| STS | Standard Template Shape E2 | STD | 38 | None | None | std_E2.cmx | | | |
| STS | Standard Template Shape E3 | STD | 39 | None | None | std_E3.cmx | | | |
| STS | Standard Template Shape E4 | STD | 40 | None | None | std_E4.cmx | | | |
| STS | Standard Template Shape E5 | STD | 41 | None | None | std_E5.cmx | | | |
| STS | Standard Template Shape E6 | STD | 42 | None | None | std_E6.cmx | | | |
| STS | Standard Template Shape E7 | STD | 43 | None | None | std_E7.cmx | | | |
| STS | Standard Template Shape E8 | STD | 44 | None | None | std_E8.cmx | | | |
| STS | Standard Template Shape E9 | STD | 45 | None | None | std_E9.cmx | | | |
| STS | Standard Template Shape F1 | STD | 46 | None | None | std_F1.cmx | | | |
| STS | Standard Template Shape F2 | STD | 47 | None | None | std_F2.cmx | | | |
| STS | Standard Template Shape F3 | STD | 48 | None | None | std_F3.cmx | | | |
| STS | Standard Template Shape F4 | STD | 49 | None | None | std_F4.cmx | | | |
| STS | Standard Template Shape F5 | STD | 50 | None | None | std_F5.cmx | | | |
| STS | Standard Template Shape F6 | STD | 51 | None | None | std_F6.cmx | | | |
| STS | Standard Template Shape F7 | STD | 52 | None | None | std_F7.cmx | | | |
| STS | Standard Template Shape F8 | STD | 53 | None | None | std_F8.cmx | | | |
| STS | Standard Template Shape F9 | STD | 54 | None | None | std_F9.cmx | | | |
| STS | Standard Template Shape G1 | STD | 55 | None | None | std_G1.cmx | | | |
| STS | Standard Template Shape G2 | STD | 56 | None | None | std_G2.cmx | | | |
| STS | Standard Template Shape G3 | STD | 57 | None | None | std_G3.cmx | | | |
| STS | Standard Template Shape G4 | STD | 58 | None | None | std_G4.cmx | | | |
| STS | Standard Template Shape G5 | STD | 59 | None | None | std_G5.cmx | | | |
| STS | Standard Template Shape G6 | STD | 60 | None | None | std_G6.cmx | | | |
| STS | Standard Template Shape G7 | STD | 61 | None | None | std_G7.cmx | | | |
| STS | Standard Template Shape G8 | STD | 62 | None | None | std_G8.cmx | | | |
| STS | Standard Template Shape G9 | STD | 63 | None | None | std_G9.cmx | | | |
| STS | Standard Template Shape H1 | STD | 64 | None | None | std_H1.cmx | | | |
| STS | Standard Template Shape H2 | STD | 65 | None | None | std_H2.cmx | | | |
| STS | Standard Template Shape H3 | STD | 66 | None | None | std_H3.cmx | | | |
| STS | Standard Template Shape H4 | STD | 67 | None | None | std_H4.cmx | | | |
| STS | Standard Template Shape H5 | STD | 68 | None | None | std_H5.cmx | | | |
| STS | Standard Template Shape H6 | STD | 69 | None | None | std_H6.cmx | | | |
| STS | Standard Template Shape H7 | STD | 70 | None | None | std_H7.cmx | | | |
| STS | Standard Template Shape H8 | STD | 71 | None | None | std_H8.cmx | | | |
| STS | Standard Template Shape H9 | STD | 72 | None | None | std_H9.cmx | | | |
| STS | Standard Template Shape I1 | STD | 73 | None | None | std_I1.cmx | | | |
| STS | Standard Template Shape I2 | STD | 74 | None | None | std_I2.cmx | | | |
| STS | Standard Template Shape I3 | STD | 75 | None | None | std_I3.cmx | | | |
| STS | Standard Template Shape I4 | STD | 76 | None | None | std_I4.cmx | | | |
| STS | Standard Template Shape I5 | STD | 77 | None | None | std_I5.cmx | | | |
| STS | Standard Template Shape I6 | STD | 78 | None | None | std_I6.cmx | | | |
| STS | Standard Template Shape I7 | STD | 79 | None | None | std_I7.cmx | | | |
| STS | Standard Template Shape I8 | STD | 80 | None | None | std_I8.cmx | | | |
| STS | Standard Template Shape I9 | STD | 81 | None | None | std_I9.cmx | | | |
| TTS | Trilingual Template Shape A1 | TRI | 1 | None | None | tri_A1.cmx | | | |
| TTS | Trilingual Template Shape A2 | TRI | 2 | None | None | tri_A2.cmx | | | |
| TTS | Trilingual Template Shape A3 | TRI | 3 | None | None | tri_A3.cmx | | | |
| TTS | Trilingual Template Shape A4 | TRI | 4 | None | None | tri_A4.cmx | | | |
| TTS | Trilingual Template Shape A5 | TRI | 5 | None | None | tri_A5.cmx | | | |
| TTS | Trilingual Template Shape A6 | TRI | 6 | None | None | tri_A6.cmx | | | |
| TTS | Trilingual Template Shape A7 | TRI | 7 | None | None | tri_A7.cmx | | | |
| TTS | Trilingual Template Shape A8 | TRI | 8 | None | None | tri_A8.cmx | | | |
| TTS | Trilingual Template Shape A9 | TRI | 9 | None | None | tri_A9.cmx | | | |
| TTS | Trilingual Template Shape B1 | TRI | 10 | None | None | tri_B1.cmx | | | |
| TTS | Trilingual Template Shape B2 | TRI | 11 | None | None | tri_B2.cmx | | | |
| TTS | Trilingual Template Shape B3 | TRI | 12 | None | None | tri_B3.cmx | | | |
| TTS | Trilingual Template Shape B4 | TRI | 13 | None | None | tri_B4.cmx | | | |
| TTS | Trilingual Template Shape B5 | TRI | 14 | None | None | tri_B5.cmx | | | |
| TTS | Trilingual Template Shape B6 | TRI | 15 | None | None | tri_B6.cmx | | | |
| TTS | Trilingual Template Shape B7 | TRI | 16 | None | None | tri_B7.cmx | | | |
| TTS | Trilingual Template Shape B8 | TRI | 17 | None | None | tri_B8.cmx | | | |
| TTS | Trilingual Template Shape B9 | TRI | 18 | None | None | tri_B9.cmx | | | |
| TTS | Trilingual Template Shape C1 | TRI | 19 | None | None | tri_C1.cmx | | | |
| TTS | Trilingual Template Shape C2 | TRI | 20 | None | None | tri_C2.cmx | | | |
| TTS | Trilingual Template Shape C3 | TRI | 21 | None | None | tri_C3.cmx | | | |
| TTS | Trilingual Template Shape C4 | TRI | 22 | None | None | tri_C4.cmx | | | |
| TTS | Trilingual Template Shape C5 | TRI | 23 | None | None | tri_C5.cmx | | | |

FIG. 33B

| TopicCode | SubjectName | SubjectCat | SubjectListOrder | TxtFile | BmpFile | CdrFile | Author | Date | Description |
|---|---|---|---|---|---|---|---|---|---|
| TTS | Trilingual Template Shape C6 | TRI | 24 | None | None | tri_C6.cmx | | | |
| TTS | Trilingual Template Shape C7 | TRI | 25 | None | None | tri_C7.cmx | | | |
| TTS | Trilingual Template Shape C8 | TRI | 26 | None | None | tri_C8.cmx | | | |
| TTS | Trilingual Template Shape C9 | TRI | 27 | None | None | tri_C9.cmx | | | |
| TTS | Trilingual Template Shape D1 | TRI | 28 | None | None | tri_D1.cmx | | | |
| TTS | Trilingual Template Shape D2 | TRI | 29 | None | None | tri_D2.cmx | | | |
| TTS | Trilingual Template Shape D3 | TRI | 30 | None | None | tri_D3.cmx | | | |
| TTS | Trilingual Template Shape D4 | TRI | 31 | None | None | tri_D4.cmx | | | |
| TTS | Trilingual Template Shape D5 | TRI | 32 | None | None | tri_D5.cmx | | | |
| TTS | Trilingual Template Shape D6 | TRI | 33 | None | None | tri_D6.cmx | | | |
| TTS | Trilingual Template Shape D7 | TRI | 34 | None | None | tri_D7.cmx | | | |
| TTS | Trilingual Template Shape D8 | TRI | 35 | None | None | tri_D8.cmx | | | |
| TTS | Trilingual Template Shape D9 | TRI | 36 | None | None | tri_D9.cmx | | | |
| TTS | Trilingual Template Shape E1 | TRI | 37 | None | None | tri_E1.cmx | | | |
| TTS | Trilingual Template Shape E2 | TRI | 38 | None | None | tri_E2.cmx | | | |
| TTS | Trilingual Template Shape E3 | TRI | 39 | None | None | tri_E3.cmx | | | |
| TTS | Trilingual Template Shape E4 | TRI | 40 | None | None | tri_E4.cmx | | | |
| TTS | Trilingual Template Shape E5 | TRI | 41 | None | None | tri_E5.cmx | | | |
| TTS | Trilingual Template Shape E6 | TRI | 42 | None | None | tri_E6.cmx | | | |
| TTS | Trilingual Template Shape E7 | TRI | 43 | None | None | tri_E7.cmx | | | |
| TTS | Trilingual Template Shape E8 | TRI | 44 | None | None | tri_E8.cmx | | | |
| TTS | Trilingual Template Shape E9 | TRI | 45 | None | None | tri_E9.cmx | | | |
| TTS | Trilingual Template Shape F1 | TRI | 46 | None | None | tri_F1.cmx | | | |
| TTS | Trilingual Template Shape F2 | TRI | 47 | None | None | tri_F2.cmx | | | |
| TTS | Trilingual Template Shape F3 | TRI | 48 | None | None | tri_F3.cmx | | | |
| TTS | Trilingual Template Shape F4 | TRI | 49 | None | None | tri_F4.cmx | | | |
| TTS | Trilingual Template Shape F5 | TRI | 50 | None | None | tri_F5.cmx | | | |
| TTS | Trilingual Template Shape F6 | TRI | 51 | None | None | tri_F6.cmx | | | |
| TTS | Trilingual Template Shape F7 | TRI | 52 | None | None | tri_F7.cmx | | | |
| TTS | Trilingual Template Shape F8 | TRI | 53 | None | None | tri_F8.cmx | | | |
| TTS | Trilingual Template Shape F9 | TRI | 54 | None | None | tri_F9.cmx | | | |
| TTS | Trilingual Template Shape G1 | TRI | 55 | None | None | tri_G1.cmx | | | |
| TTS | Trilingual Template Shape G2 | TRI | 56 | None | None | tri_G2.cmx | | | |
| TTS | Trilingual Template Shape G3 | TRI | 57 | None | None | tri_G3.cmx | | | |
| TTS | Trilingual Template Shape G4 | TRI | 58 | None | None | tri_G4.cmx | | | |
| TTS | Trilingual Template Shape G5 | TRI | 59 | None | None | tri_G5.cmx | | | |
| TTS | Trilingual Template Shape G6 | TRI | 60 | None | None | tri_G6.cmx | | | |
| TTS | Trilingual Template Shape G7 | TRI | 61 | None | None | tri_G7.cmx | | | |
| TTS | Trilingual Template Shape G8 | TRI | 62 | None | None | tri_G8.cmx | | | |
| TTS | Trilingual Template Shape G9 | TRI | 63 | None | None | tri_G9.cmx | | | |
| TTS | Trilingual Template Shape H1 | TRI | 64 | None | None | tri_H1.cmx | | | |
| TTS | Trilingual Template Shape H2 | TRI | 65 | None | None | tri_H2.cmx | | | |
| TTS | Trilingual Template Shape H3 | TRI | 66 | None | None | tri_H3.cmx | | | |
| TTS | Trilingual Template Shape H4 | TRI | 67 | None | None | tri_H4.cmx | | | |
| TTS | Trilingual Template Shape H5 | TRI | 68 | None | None | tri_H5.cmx | | | |
| TTS | Trilingual Template Shape H6 | TRI | 69 | None | None | tri_H6.cmx | | | |
| TTS | Trilingual Template Shape H7 | TRI | 70 | None | None | tri_H7.cmx | | | |
| TTS | Trilingual Template Shape H8 | TRI | 71 | None | None | tri_H8.cmx | | | |
| TTS | Trilingual Template Shape H9 | TRI | 72 | None | None | tri_H9.cmx | | | |
| TTS | Trilingual Template Shape I1 | TRI | 73 | None | None | tri_I1.cmx | | | |
| TTS | Trilingual Template Shape I2 | TRI | 74 | None | None | tri_I2.cmx | | | |
| TTS | Trilingual Template Shape I3 | TRI | 75 | None | None | tri_I3.cmx | | | |
| TTS | Trilingual Template Shape I4 | TRI | 76 | None | None | tri_I4.cmx | | | |
| TTS | Trilingual Template Shape I5 | TRI | 77 | None | None | tri_I5.cmx | | | |
| TTS | Trilingual Template Shape I6 | TRI | 78 | None | None | tri_I6.cmx | | | |
| TTS | Trilingual Template Shape I7 | TRI | 79 | None | None | tri_I7.cmx | | | |
| TTS | Trilingual Template Shape I8 | TRI | 80 | None | None | tri_I8.cmx | | | |
| TTS | Trilingual Template Shape I9 | TRI | 81 | None | None | tri_I9.cmx | | | |
| TUT | Import Die | ALL | 1 | tut_id.txt | tut_id.bmp | None | | | |
| TUT | Document Setup | ALL | 2 | tut_ds.txt | tut_ds.bmp | None | | | |
| TUT | Format Die | ALL | 3 | tut_fd.txt | tut_fd.bmp | None | | | |
| TUT | Apply Guidelines | ALL | 4 | tut_ag.txt | tut_ag.bmp | None | | | |
| TUT | Determine Proper Templates | ALL | 5 | tut_dpt.txt | tut_dpt.bmp | None | | | |
| TUT | Format Grid | ALL | 6 | tut_fg.txt | tut_fg.bmp | None | | | |
| TUT | Scale Graphics | ALL | 7 | tut_sg.txt | tut_sg.bmp | None | | | |
| TUT | Adjust the Background | ALL | 8 | tut_ab.txt | tut_ab.bmp | None | | | |
| TUT | Adjust the Repeat Pattern | ALL | 9 | tut_arp.txt | tut_arp.bmp | None | | | |
| TUT | Trilingual Product Names | TRI | 10 | tut_tpn.txt | tut_tpn.bmp | None | | | |
| TUT | Unilingual Product Names | UNI | 11 | tut_upn.txt | tut_upn.bmp | None | | | |
| TUT | Trilingual Sub-Brands | TRI | 12 | tut_tsb.txt | tut_tsb.bmp | None | | | |
| TUT | Unilingual Sub-Brands | UNI | 13 | tut_usb.txt | tut_usb.bmp | None | | | |
| TUT | Trilingual Product Descriptor | TRI | 14 | tut_tpd.txt | tut_tpd.bmp | None | | | |
| TUT | Unilingual Product Descriptor | UNI | 15 | tut_upd.txt | tut_upd.bmp | None | | | |
| TUT | Trilingual Additional Text | TRI | 16 | tut_tat.txt | tut_tat.bmp | None | | | |
| TUT | Unilingual Additional Text | UNI | 17 | tut_uat.txt | tut_uat.bmp | None | | | |
| TUT | Printing Tolerances | ALL | 18 | tut_rpsb.txt | tut_rpsb.bmp | None | | | |
| TUT | Trilingual Back Panel | TRI | 19 | tut_tbp.txt | tut_tbp.bmp | None | | | |
| TUT | Unilingual Back Panel | UNI | 20 | tut_ubp.txt | tut_ubp.bmp | None | | | |
| TUT | Standard Back Panel | STD | 21 | tut_sbp.txt | tut_sbp.bmp | None | | | |
| TUT | Back Panel Illustrations | UNITRI | 22 | tut_bpi.txt | tut_bpi.bmp | None | | | |
| TUT | Core Return ID Block Size | UNITRI | 23 | tut_crid.txt | tut_crid.bmp | None | | | |

FIG. 33C

| TopicCode | SubjectName | SubjectCat | SubjectListOrder | TxtFile | BmpFile | CdrFile | Author | Date | Description |
|---|---|---|---|---|---|---|---|---|---|
| TUT | Legal Address Block | UNITRI | 24 | tut_lab.txt | tut_lab.bmp | None | | | |
| TUT | Package Part Number | UNITRI | 25 | tut_ppn.txt | tut_ppn.bmp | None | | | |
| TUT | Edge Codes | UNITRI | 26 | tut_ec.txt | tut_ec.bmp | None | | | |
| UTS | Unilingual Template Shape A2 | UNI | 1 | None | None | uni_A1.cmx | | | |
| UTS | Unilingual Template Shape A2 | UNI | 2 | None | None | uni_A2.cmx | | | |
| UTS | Unilingual Template Shape A3 | UNI | 3 | None | None | uni_A3.cmx | | | |
| UTS | Unilingual Template Shape A4 | UNI | 4 | None | None | uni_A4.cmx | | | |
| UTS | Unilingual Template Shape A5 | UNI | 5 | None | None | uni_A5.cmx | | | |
| UTS | Unilingual Template Shape A6 | UNI | 6 | None | None | uni_A6.cmx | | | |
| UTS | Unilingual Template Shape A7 | UNI | 7 | None | None | uni_A7.cmx | | | |
| UTS | Unilingual Template Shape A8 | UNI | 8 | None | None | uni_A8.cmx | | | |
| UTS | Unilingual Template Shape A9 | UNI | 9 | None | None | uni_A9.cmx | | | |
| UTS | Unilingual Template Shape B1 | UNI | 10 | None | None | uni_B1.cmx | | | |
| UTS | Unilingual Template Shape B2 | UNI | 11 | None | None | uni_B2.cmx | | | |
| UTS | Unilingual Template Shape B3 | UNI | 12 | None | None | uni_B3.cmx | | | |
| UTS | Unilingual Template Shape B4 | UNI | 13 | None | None | uni_B4.cmx | | | |
| UTS | Unilingual Template Shape B5 | UNI | 14 | None | None | uni_B5.cmx | | | |
| UTS | Unilingual Template Shape B6 | UNI | 15 | None | None | uni_B6.cmx | | | |
| UTS | Unilingual Template Shape B7 | UNI | 16 | None | None | uni_B7.cmx | | | |
| UTS | Unilingual Template Shape B8 | UNI | 17 | None | None | uni_B8.cmx | | | |
| UTS | Unilingual Template Shape B9 | UNI | 18 | None | None | uni_B9.cmx | | | |
| UTS | Unilingual Template Shape C1 | UNI | 19 | None | None | uni_C1.cmx | | | |
| UTS | Unilingual Template Shape C2 | UNI | 20 | None | None | uni_C2.cmx | | | |
| UTS | Unilingual Template Shape C3 | UNI | 21 | None | None | uni_C3.cmx | | | |
| UTS | Unilingual Template Shape C4 | UNI | 22 | None | None | uni_C4.cmx | | | |
| UTS | Unilingual Template Shape C5 | UNI | 23 | None | None | uni_C5.cmx | | | |
| UTS | Unilingual Template Shape C6 | UNI | 24 | None | None | uni_C6.cmx | | | |
| UTS | Unilingual Template Shape C7 | UNI | 25 | None | None | uni_C7.cmx | | | |
| UTS | Unilingual Template Shape C8 | UNI | 26 | None | None | uni_C8.cmx | | | |
| UTS | Unilingual Template Shape C9 | UNI | 27 | None | None | uni_C9.cmx | | | |
| UTS | Unilingual Template Shape D1 | UNI | 28 | None | None | uni_D1.cmx | | | |
| UTS | Unilingual Template Shape D2 | UNI | 29 | None | None | uni_D2.cmx | | | |
| UTS | Unilingual Template Shape D3 | UNI | 30 | None | None | uni_D3.cmx | | | |
| UTS | Unilingual Template Shape D4 | UNI | 31 | None | None | uni_D4.cmx | | | |
| UTS | Unilingual Template Shape D5 | UNI | 32 | None | None | uni_D5.cmx | | | |
| UTS | Unilingual Template Shape D6 | UNI | 33 | None | None | uni_D6.cmx | | | |
| UTS | Unilingual Template Shape D7 | UNI | 34 | None | None | uni_D7.cmx | | | |
| UTS | Unilingual Template Shape D8 | UNI | 35 | None | None | uni_D8.cmx | | | |
| UTS | Unilingual Template Shape D9 | UNI | 36 | None | None | uni_D9.cmx | | | |
| UTS | Unilingual Template Shape E1 | UNI | 37 | None | None | uni_E1.cmx | | | |
| UTS | Unilingual Template Shape E2 | UNI | 38 | None | None | uni_E2.cmx | | | |
| UTS | Unilingual Template Shape E3 | UNI | 39 | None | None | uni_E3.cmx | | | |
| UTS | Unilingual Template Shape E4 | UNI | 40 | None | None | uni_E4.cmx | | | |
| UTS | Unilingual Template Shape E5 | UNI | 41 | None | None | uni_E5.cmx | | | |
| UTS | Unilingual Template Shape E6 | UNI | 42 | None | None | uni_E6.cmx | | | |
| UTS | Unilingual Template Shape E7 | UNI | 43 | None | None | uni_E7.cmx | | | |
| UTS | Unilingual Template Shape E8 | UNI | 44 | None | None | uni_E8.cmx | | | |
| UTS | Unilingual Template Shape E9 | UNI | 45 | None | None | uni_E9.cmx | | | |
| UTS | Unilingual Template Shape F1 | UNI | 46 | None | None | uni_F1.cmx | | | |
| UTS | Unilingual Template Shape F2 | UNI | 47 | None | None | uni_F2.cmx | | | |
| UTS | Unilingual Template Shape F3 | UNI | 48 | None | None | uni_F3.cmx | | | |
| UTS | Unilingual Template Shape F4 | UNI | 49 | None | None | uni_F4.cmx | | | |
| UTS | Unilingual Template Shape F5 | UNI | 50 | None | None | uni_F5.cmx | | | |
| UTS | Unilingual Template Shape F6 | UNI | 51 | None | None | uni_F6.cmx | | | |
| UTS | Unilingual Template Shape F7 | UNI | 52 | None | None | uni_F7.cmx | | | |
| UTS | Unilingual Template Shape F8 | UNI | 53 | None | None | uni_F8.cmx | | | |
| UTS | Unilingual Template Shape F9 | UNI | 54 | None | None | uni_F9.cmx | | | |
| UTS | Unilingual Template Shape G1 | UNI | 55 | None | None | uni_G1.cmx | | | |
| UTS | Unilingual Template Shape G2 | UNI | 56 | None | None | uni_G2.cmx | | | |
| UTS | Unilingual Template Shape G3 | UNI | 57 | None | None | uni_G3.cmx | | | |
| UTS | Unilingual Template Shape G4 | UNI | 58 | None | None | uni_G4.cmx | | | |
| UTS | Unilingual Template Shape G5 | UNI | 59 | None | None | uni_G5.cmx | | | |
| UTS | Unilingual Template Shape G6 | UNI | 60 | None | None | uni_G6.cmx | | | |
| UTS | Unilingual Template Shape G7 | UNI | 61 | None | None | uni_G7.cmx | | | |
| UTS | Unilingual Template Shape G8 | UNI | 62 | None | None | uni_G8.cmx | | | |
| UTS | Unilingual Template Shape G9 | UNI | 63 | None | None | uni_G9.cmx | | | |
| UTS | Unilingual Template Shape H1 | UNI | 64 | None | None | uni_H1.cmx | | | |
| UTS | Unilingual Template Shape H2 | UNI | 65 | None | None | uni_H2.cmx | | | |
| UTS | Unilingual Template Shape H3 | UNI | 66 | None | None | uni_H3.cmx | | | |
| UTS | Unilingual Template Shape H4 | UNI | 67 | None | None | uni_H4.cmx | | | |
| UTS | Unilingual Template Shape H5 | UNI | 68 | None | None | uni_H5.cmx | | | |
| UTS | Unilingual Template Shape H6 | UNI | 69 | None | None | uni_H6.cmx | | | |
| UTS | Unilingual Template Shape H7 | UNI | 70 | None | None | uni_H7.cmx | | | |
| UTS | Unilingual Template Shape H8 | UNI | 71 | None | None | uni_H8.cmx | | | |
| UTS | Unilingual Template Shape H9 | UNI | 72 | None | None | uni_H9.cmx | | | |
| UTS | Unilingual Template Shape I1 | UNI | 73 | None | None | uni_I1.cmx | | | |
| UTS | Unilingual Template Shape I2 | UNI | 74 | None | None | uni_I2.cmx | | | |
| UTS | Unilingual Template Shape I3 | UNI | 75 | None | None | uni_I3.cmx | | | |
| UTS | Unilingual Template Shape I4 | UNI | 76 | None | None | uni_I4.cmx | | | |
| UTS | Unilingual Template Shape I5 | UNI | 77 | None | None | uni_I5.cmx | | | |
| UTS | Unilingual Template Shape I6 | UNI | 78 | None | None | uni_I6.cmx | | | |

FIG. 33D

| TopicCode | SubjectName | SubjectCat | SubjectListOrder | TxtFile | BmpFile | CdrFile | Author | Date | Description |
|---|---|---|---|---|---|---|---|---|---|
| UTS | Unilingual Template Shape 17 | UNI | 79 | None | None | unl_17.cmx | | | |
| UTS | Unilingual Template Shape 18 | UNI | 80 | None | None | unl_18.cmx | | | |
| UTS | Unilingual Template Shape 19 | UNI | 81 | None | None | unl_19.cmx | | | |

INTERACTIVE GRAPHIC PROCESSING SYSTEM FOR PACKAGES AND LABELS

FIELD OF THE INVENTION

The present invention concerns a novel computer-based system for aiding in the design of packages and labels.

BACKGROUND OF THE INVENTION

A company having a number of different products may need to use a different package or a container for each different product. Some companies may have thousands of different products, each requiring a package having a different size and shape. Often there are certain graphical features which remain consistent with all of the packages or which require only minor modifications among the different packages. Such consistent features may include the brand name, logo, product name location, relative sizes and spacing of certain information, etc.

For example, a company in the automotive products field may manufacture diverse products such as spark plugs, batteries, filters, brake linings, antifreeze, etc., with each product requiring a different package but carrying the same name brand name and logo of the automotive products company and also having a relatively consistent overall graphical design.

We have discovered a novel system that can automatically configure labels, graphics, printed matter, etc. for packages based upon a user's input of the dimensions for the package. It is an object of the present invention to provide a system for aiding the designer in selecting the correct, predesigned graphics for panels on a package. It is a further object of the present invention to provide a novel method for applying graphics to packaging and/or labels using an interactive computer operated by a user.

Another object of the present invention is to provide a method for automatically configuring labels, graphics, printed matter, etc. for packages based upon a user's input of the dimensions for the package and operation of a drawing program by the user.

A still further object of the present invention is to provide a system in which a basic style design having consistent graphics can easily be provided on packages regardless of the size, shape or the type of the package.

Other objects and advantages of the present invention will become apparent as the description proceeds.

SUMMARY OF THE INVENTION

In accordance with the present invention, there is provided a method for applying graphics to packaging and/or labels using an interactive computer operated by a user. In the illustrative embodiment, the method comprises the steps of providing a database containing predesigned graphic templates; providing a drawing program; providing a template selector; user-inputting information to the template selector; automatically selecting predesigned graphic templates from the database in response to the user-inputting step; launching the automatically selected graphic templates into the drawing program; and user-operating the drawing program to manipulate the graphics.

In an illustrative embodiment, the step of user-inputting comprises the step of entering selected dimensions of the package and/or label and also includes the step of selecting the type of language of the graphics. In this embodiment, the step of entering dimensions includes the step of entering the front panel width, the front panel height, and the side panel width. In this embodiment, the method includes the step of databasing the selected graphic template with a package name for future reference.

In one embodiment, the predesigned graphic templates comprise a plurality of templates carrying predesigned graphics including a brand name and a product name. In this embodiment, the templates are building blocks that are incomplete. In another embodiment, the predesigned graphic templates comprise a plurality of specific package and/or label examples. In this embodiment, the package or label examples are completed mechanicals.

In an illustrative embodiment, the method also includes the steps of importing a die into the drawing program; measuring the die; formatting the die; and the launching step includes the step of launching the automatically selected graphic templates to overlie the die in the drawing program.

In an illustrative embodiment, the template selector shows a two dimensional picture of the selected package, and the method includes the step of user-selecting a showing of the front of the package, a side of the package, the top of the package, and the bottom of the package. The step of user-selecting the portion of the carton to be viewed includes the step of selecting tabs corresponding to the front, side, top and bottom of the carton.

Also in accordance with the principles of the present invention, a system is provided for applying graphics to packaging and/or labels using an interactive computer operated by a user. The system comprises a database containing predesigned graphic templates. It also includes a drawing program and a template selector which is adapted to receive information from a user. The computer automatically selects predesigned graphic templates from the database in response to the user-input. The automatically selected graphic templates may be launched into the drawing program and the user may operate the drawing program to manipulate the graphics.

A more detailed explanation of the invention is provided in the following description and claims and is illustrated in the accompanying drawings.

BRIEF DESCRIPTION OF THE DRAWINGS

The Figures show portions of a system or method in accordance with the principles of the present invention.

FIGS. 33A–33E are a sample printout of a combined database containing all of the subjects.

It is understood that these drawings represent selected examples of illustrative embodiments of the invention and that the elements shown therein can be readily modified and other elements may be substituted without departing from the spirit and scope of the present invention.

DETAILED DESCRIPTION OF THE ILLUSTRATIVE EMBODIMENTS

Figure 1:
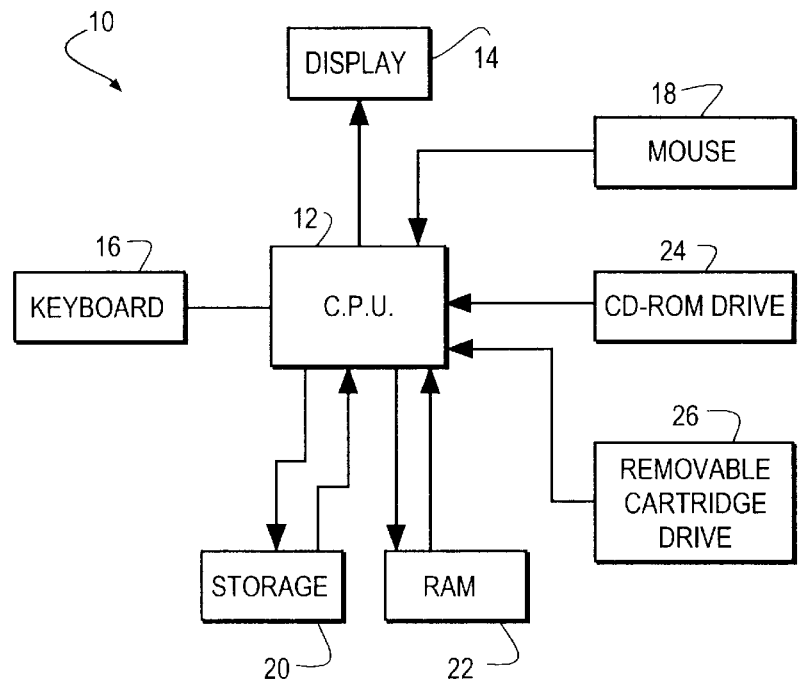
FIG. 1 is a diagram of the basic hardware.

FIG. 1 illustrates a typical interactive computer for use with the system of the present invention. The interactive computer 10 comprises a central processing unit 12, a display 14, a keyboard 16, a mouse 18, hard drive storage 20, random access memory 22, peripheral storage such as a CD ROM drive 24 and a disk drive or removable cartridge drive 26.

Figure 2:
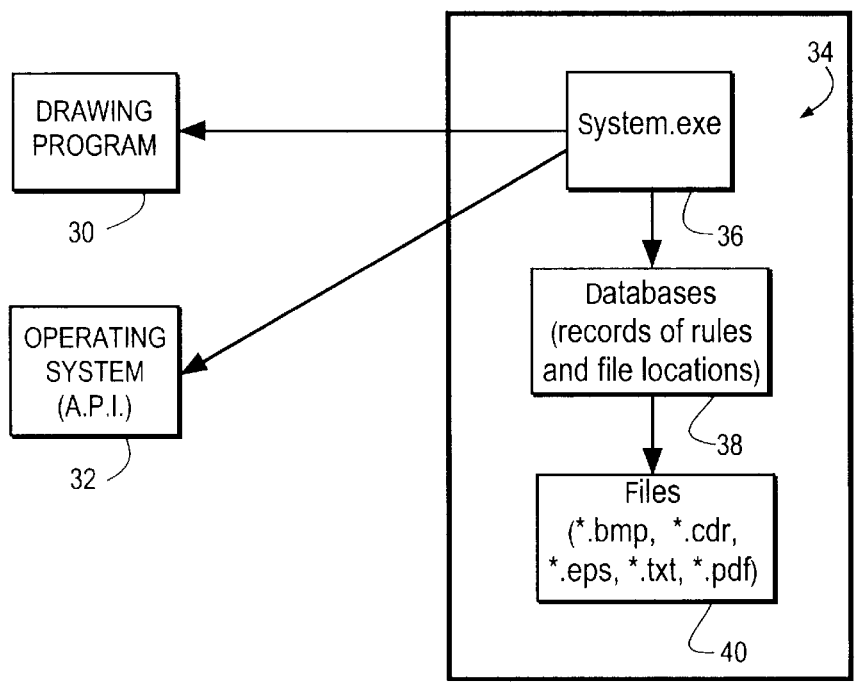
FIG. 2 is a diagram of the basic software.

Referring to FIG. 2, the basic software comprises a drawing program 30 preferably in hard drive storage 20, an operating system (application programming interface) 32 such as Microsoft Windows, and proprietary software 34 of the present invention, which is preferably packaged on a disk used with drive 26 or a CD ROM used with CD ROM drive 24, and is downloaded onto hard drive 20. Although no limitation is intended, the drawing program could be a commercial drawing program such as Corel Draw or Adobe Illustrator or another suitable drawing program. Alternatively, the drawing program could be an integral part of the proprietary software 34 instead of being a separate commercial drawing program. Proprietary software 34 comprises System.exe 36, databases including records of rules and file locations 38, and files 40 in formats such as .bmp, .cdr, .eps, .txt, .pdf, etc. It is understood that the storage or memory may be any suitable type, the operating system may be any suitable operating system and the input devices may be any other suitable input devices.

A purpose of the present invention is to provide a method and system that can enable a designer to automatically configure labels, graphics, printed matter, etc. for packages based upon the user's input of the dimensions for the package. The present invention aids the designer in selecting the correct, predesigned graphics for panels on the package. While the illustrative embodiment comprises a system that has software stored in computer memory such as hard drive 20 and uses a commercial drawing program, it is understood that the system of the present invention can be provided in any form such as via disk, tape, CD ROM, on-line, etc., without departing from the scope of the present invention.

Figure 3:
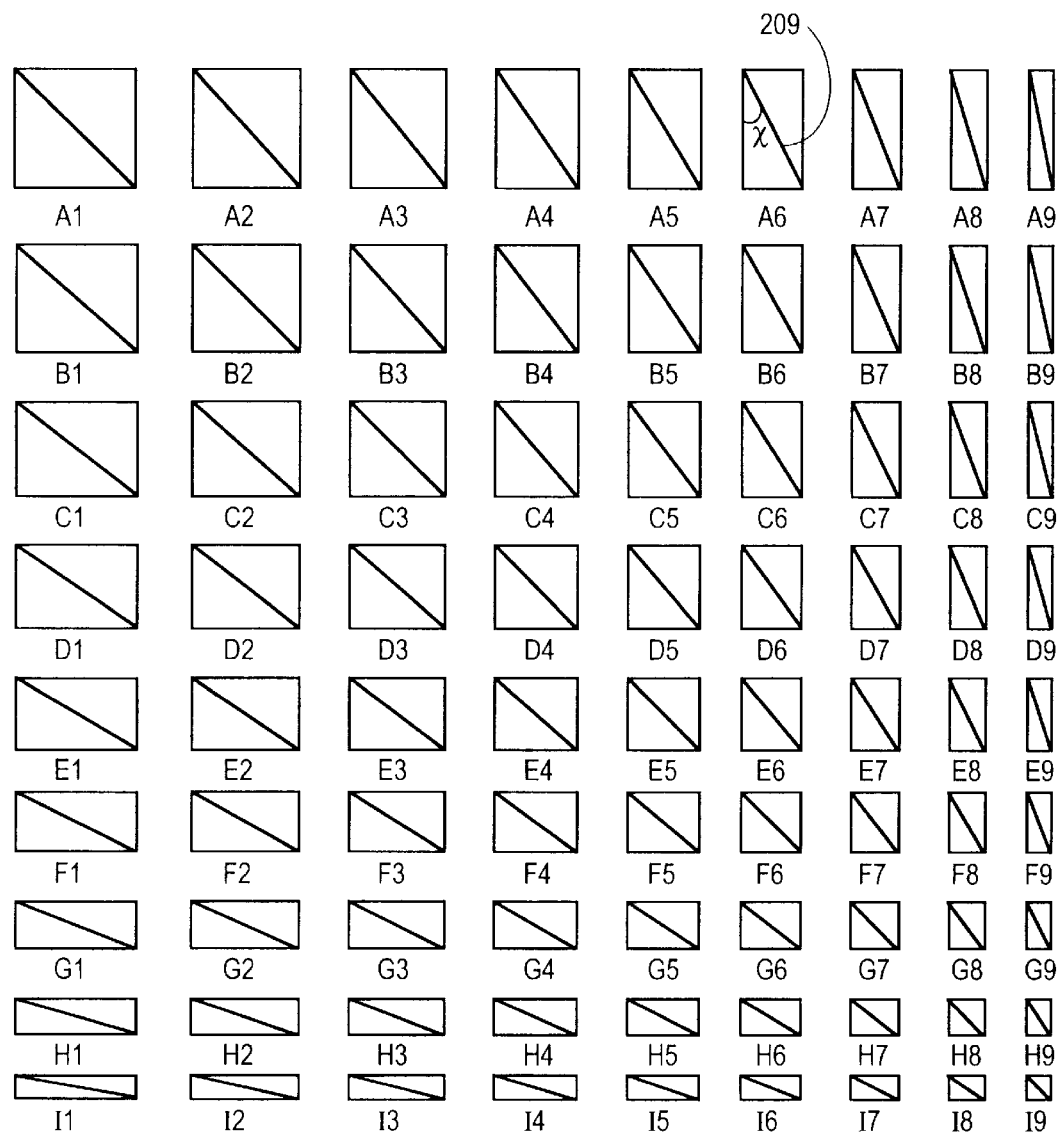
FIG. 3 is a diagrammatic view of a template shape database.
Figure 4:
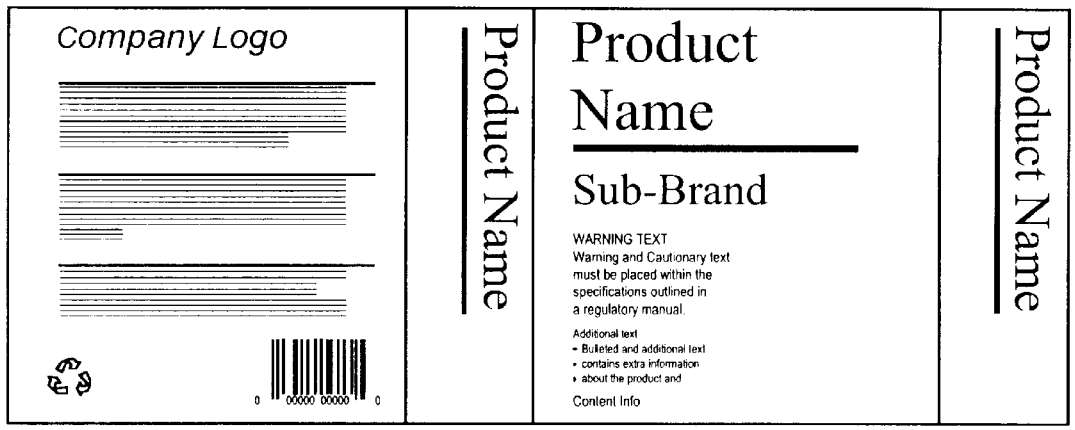
FIG. 4 is an example of predesigned graphics that can be on a package.

In order to understand the operation of the present invention, an example of a typical use will be described. It must first be understood that the system comprises predesigned graphics stored in a database. For example, as shown in FIG. 3 there is a template-shape database containing a number of template shapes, each carrying predesigned graphics (not shown). For example, the graphics could include a brand mark, a logo, a product name, a sub-brand, and other copy concerning the product including volume, weight, name of manufacturer, address, zip code, bar code, etc. An example of predesigned graphics that can be on a package is illustrated in FIG. 4.

Figure 5:
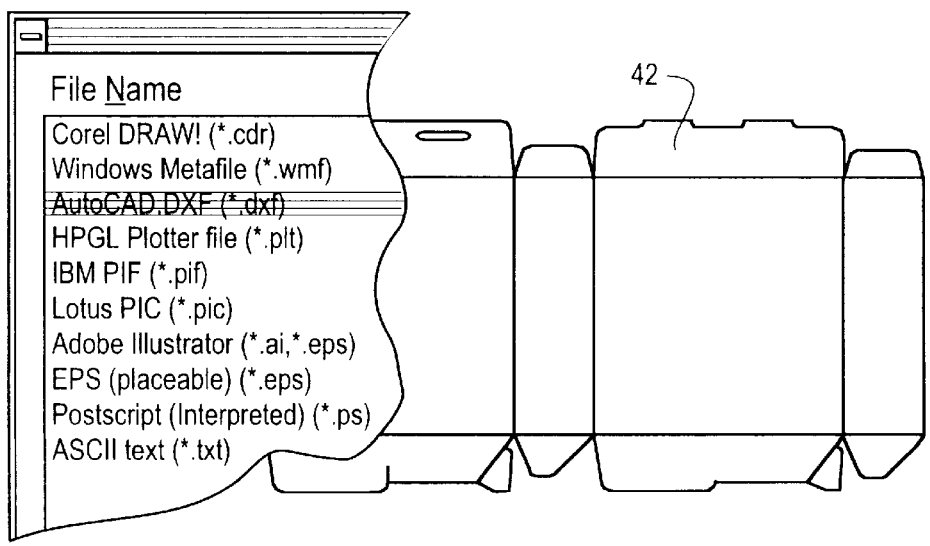
FIG. 5 is a diagrammatic representation of importing a die.

Now assume that it is desired to design a package having a shape that will enclose an automotive part, such as a filter. A designer will first prepare or have prepared a die having the desired shape. This die can be prepared on a commercial drawing program such as Corel Draw, Adobe Illustrator, etc. Referring to FIG. 5, it is seen that a die 42 has previously been prepared as an Auto CAD DXF file. This package die is imported into drawing program 30. For example, drawing program 20 could be Corel Draw as stated above.

Figure 6:
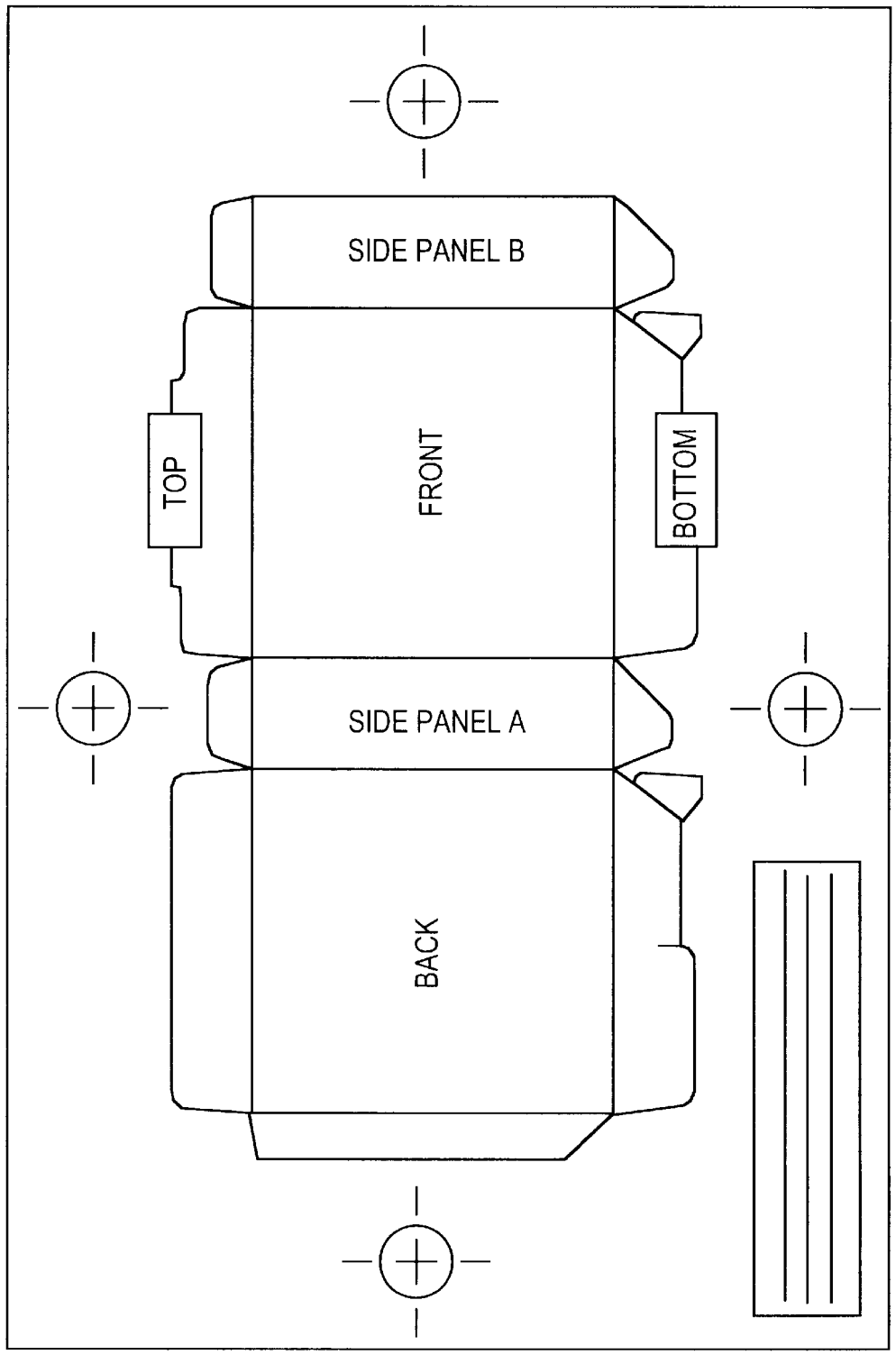
FIG. 6 is a diagrammatic representation of formatting the die.
Figure 7A:
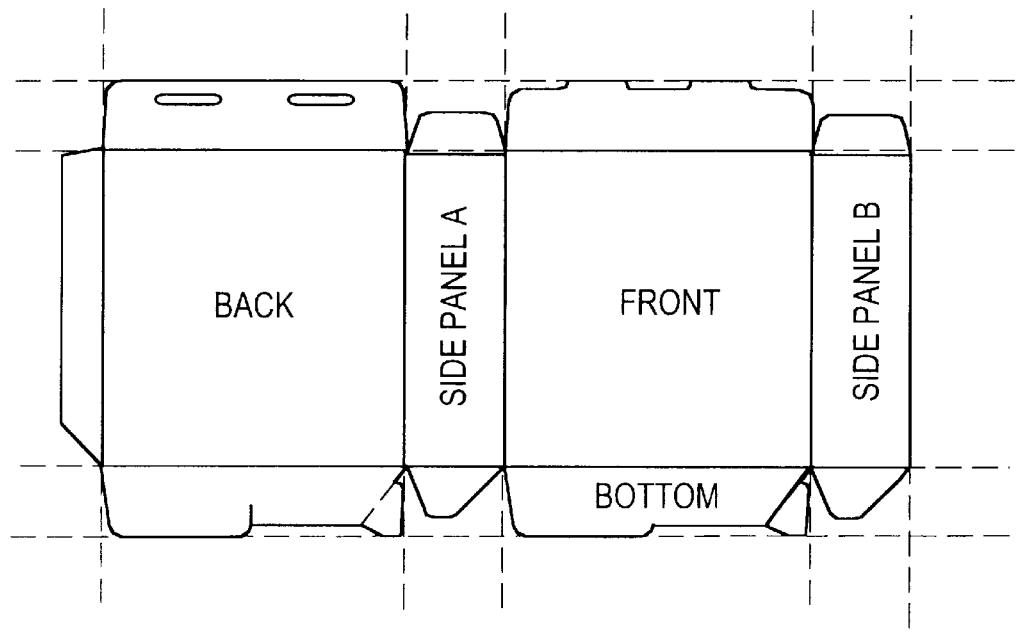
FIG. 7a is a diagrammatic representation of applying guidelines to the die.
Figure 7B:
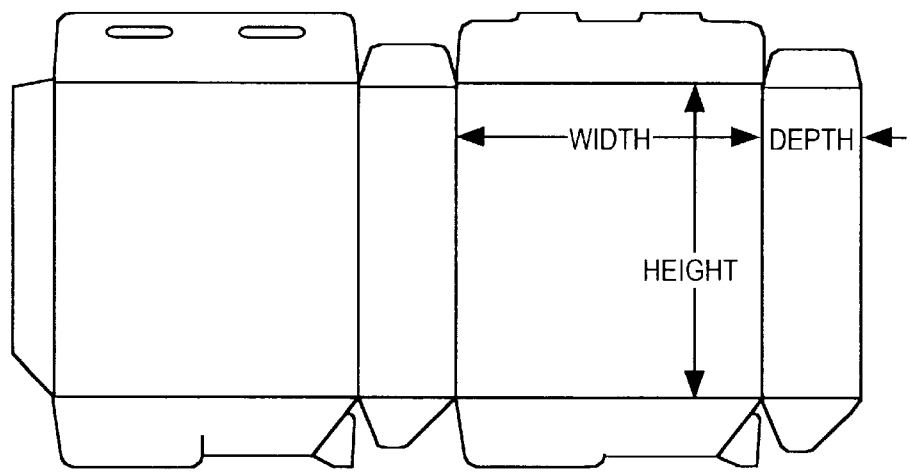
FIG. 7b is a diagrammatic representation of measuring the die.

Referring to FIG. 6, the die is first locked into Corel Draw. The die is then formatted using formatting art work that has been provided by the system of the present invention. These items, such as crop marks and a mechanical title block, are placed in proper position on the mechanical. The designer indicates what will be the front, back, side panel A, side panel b, top and bottom panels on the package. Next, referring to FIG. 7A, four horizontal and four vertical guidelines are applied to the mechanical art. Next, referring to FIG. 7B, using the drawing program the front panel width is measured, the front panel height is measured, and the side panel width of the package die is also measured. These measurements are entered into a template selector as will now be described.

Figure 8:
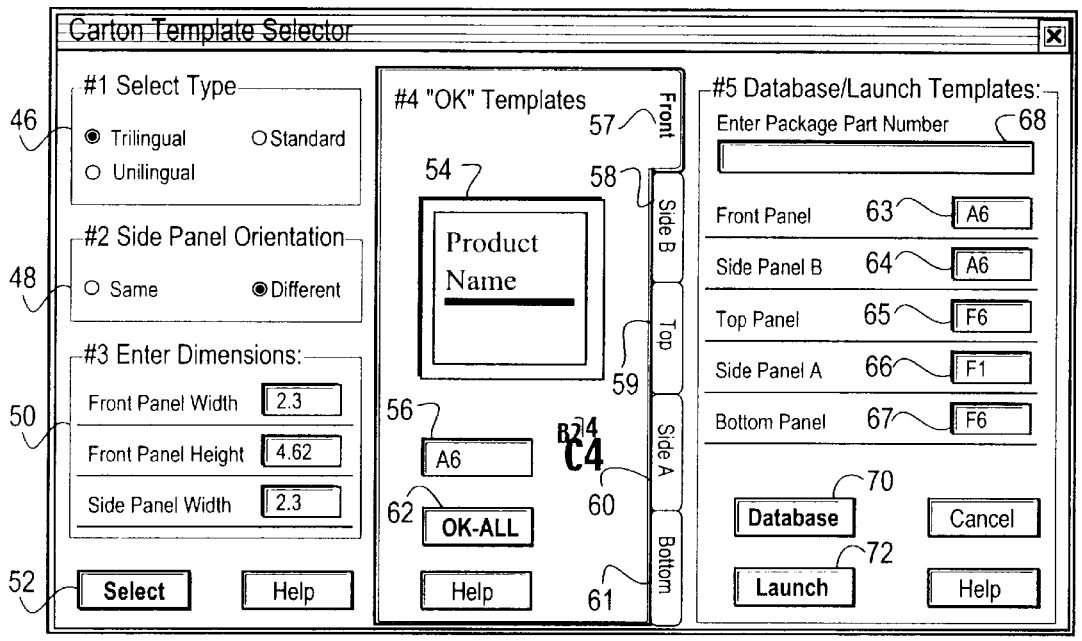
FIG. 8 is a screen shot of a carton template selector display.

Referring to FIG. 8, a template selector, as presented on display 14 and as constructed in accordance with the principles of the present invention, is illustrated. The template selector will operate the computer to select an appropriate pre-defined template for each panel of the package carton of FIG. 6 based on the measurements of the package carton. Referring to FIG. 8, it is seen that the carton template selector has user selector areas throughout the selector. First, there is an area 46 for selecting the type of language. It is seen that trilingual has been selected. The selection is made by placing the cursor adjacent "trilingual" via mouse 18 and clicking as is standard in on-screen selection. There is also an area 48 for side panel orientation. If both side panels of the carton are to be identical, then "same" is selected. It can be seen that "different" has been selected. There is also an area 50 for entering the dimensions. This area 50 contains windows in which the user inputs dimensions including the front panel width, the front panel height and the side panel width. Once these dimensions are entered, the user may click on the select button 52 and the template selector will automatically select the closest templates in the template-shape database (see FIG. 3) corresponding to the entered dimensions.

Still referring to FIG. 8, it is seen that the template selector includes a window 54 where a two-dimensional representation of the carton is presented. Since a front panel width of 2.3 was entered with a front panel height of 4.62, the closest template was template A6 which is listed in window 56, with the front panel being illustrated in two dimensions (not to scale) in window 54. The template shown in window 54 corresponds to template A6 in FIG. 3.

There are a series of tabs which can be clicked on to. The system defaults to front panel tab 57. There is also side B tab 58, top tab 59, side A tab 60, and bottom tab 61. When each of these is clicked on to, the selected item will be illustrated in two dimensions in window 54 and listed in window 56. By clicking on to tabs 57–61, the designer can see the templates with the graphics for the front panel, side panel, top and bottom of the selected package. If all are satisfactory, the designer clicks on the "Ok-All" button 62 and the template designations will appear in windows 63, 64, 65, 66 and 67. It can be seen that since the front panel width and side panel width are both 2.3 in area 50, both the front panel and side panel B are templates A6. The top panel and bottom panel are both template F6 from the FIG. 3 database and the other side panel is F1 from the FIG. 3 database. A window 68 is provided for entering the package part number. That part number is then entered and the templates for this package part number can then be inputted into a template database by clicking on button 70. Alternatively, the selected templates are launched, i.e. are imported into the drawing program by clicking on button 72.

Figure 9:
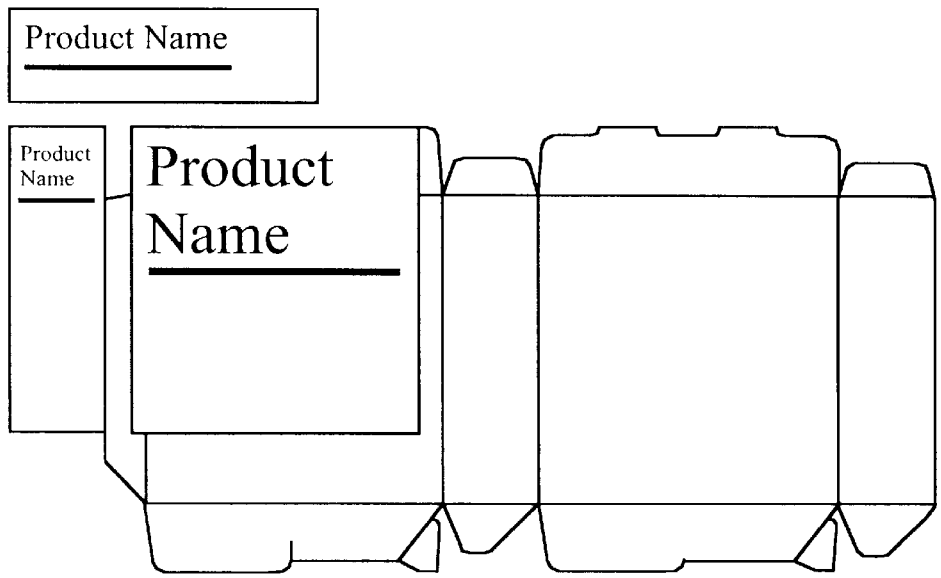
FIG. 9 is a diagrammatic view of three unique templates being imported into a drawing program.

When button 72 is clicked on to, the selected template is launched, i.e. is imported into the drawing program. Referring to FIG. 9, it can be seen that the templates that have been selected are now overlying the drawing of the package die. In this manner, the predesigned graphics can now be applied to the panels of the package. Thus a graphics layer is created on the mechanical art file. The proper template is placed on the proper panel and each panel's template is scaled proportionately from the upper left hand corner to the bottom of the panel. The height of the graphics has now achieved optimal size.

Figure 10:
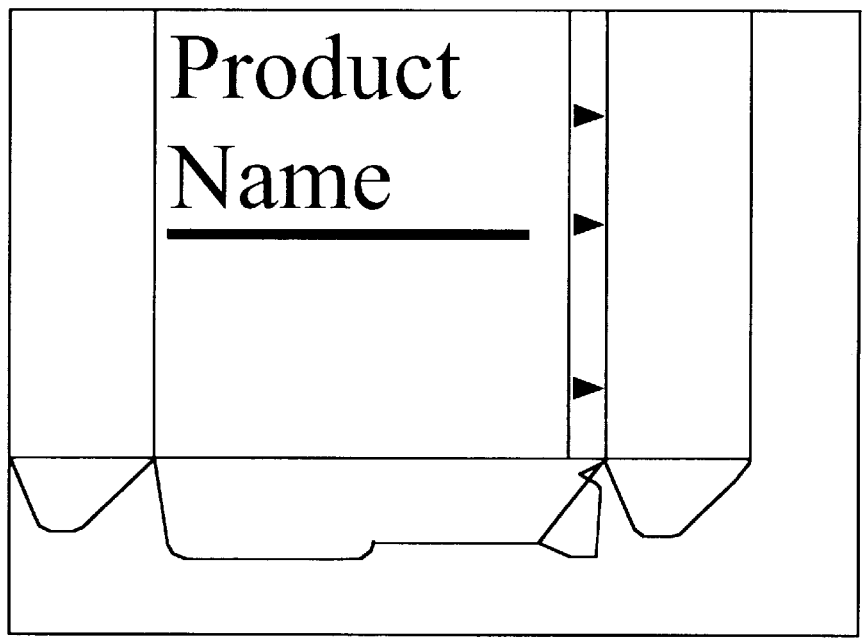
FIG. 10 is a diagrammatic view showing the adjustment of a template's background.

Referring now to FIG. 10, the background is then adjusted. To this end, the graphical elements are dragged to the edge of the panel and all sides of the panel are double checked for proper alignment of the template graphics. Using the drawing program, if the width of the graphics does not match the width of the panel, the graphics must be adjusted.

Figure 11:
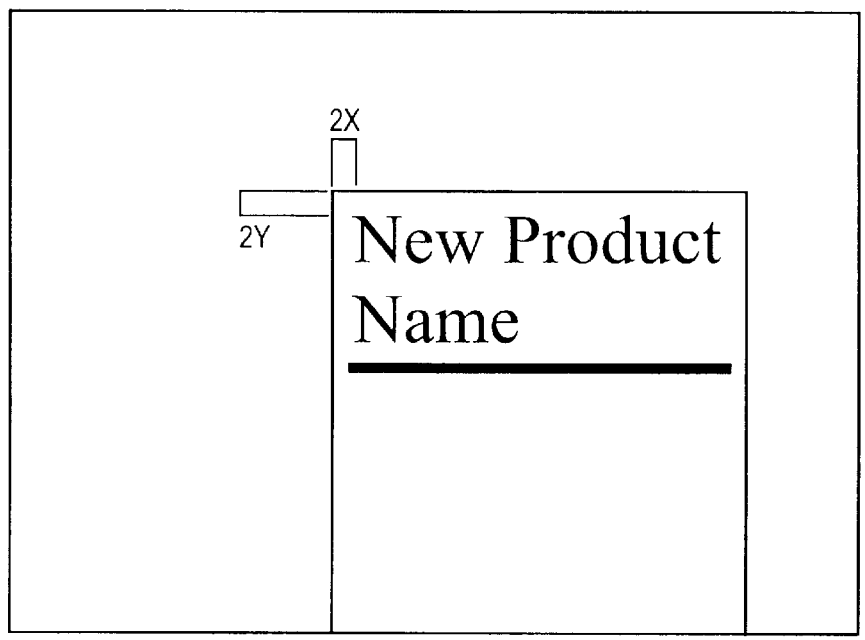
FIG. 11 is a diagrammatic view showing the positioning of a product name.

Referring to FIG. 11, certain graphic elements are a fixed part of the template file. In this example, the generic product name and a divider rule are a fixed part of the template. After the templates are scaled to the new package dimensions, the generic product name is in the correct horizontal and vertical position as well as being in the correct font style and size. The user simply has to replace the generic product name copy with the actual product name copy. The drawing program is used to input the new product name.

Figure 12:
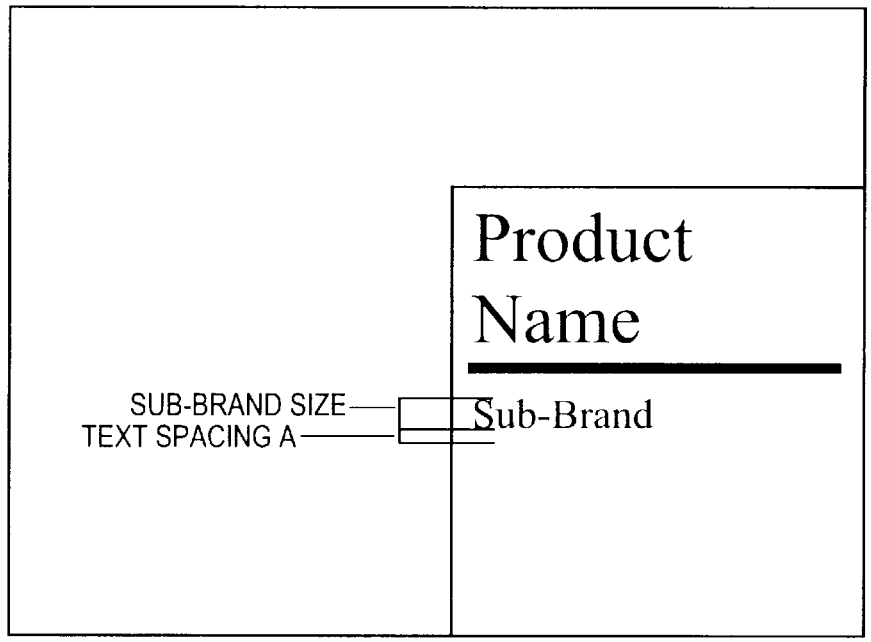
FIG. 12 is a diagrammatic view showing the positioning of a sub-brand.
Figure 13:
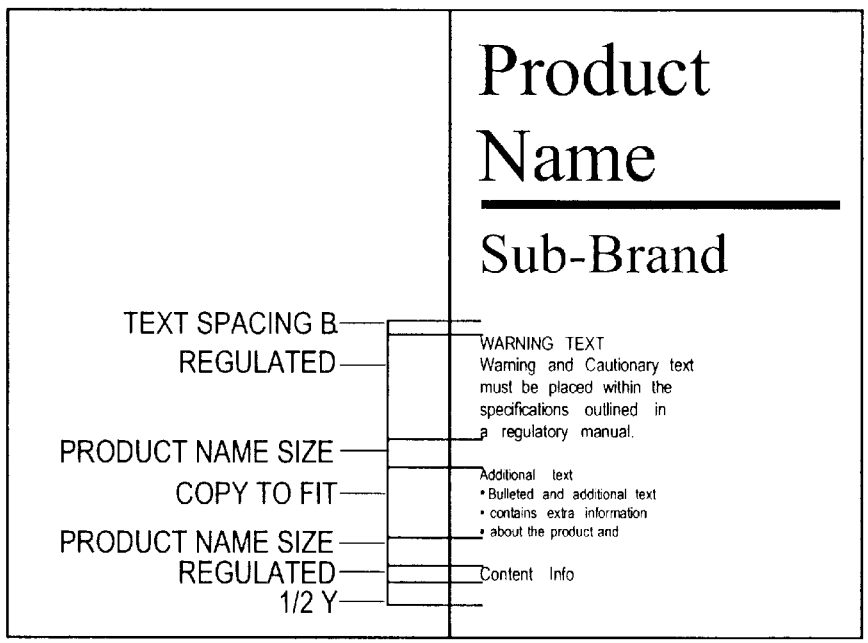
FIG. 13 is a diagrammatic view showing positioning of additional text.

Referring to FIGS. 12 and 13, other graphic elements that are not part of the fixed template file, may be added to the package mechanical. These are optional items that may change from package to package. The drawing program is used to input these elements. The calculator tool (FIG. 23) is used to determine the proper size and placement of these elements.

Figure 14:
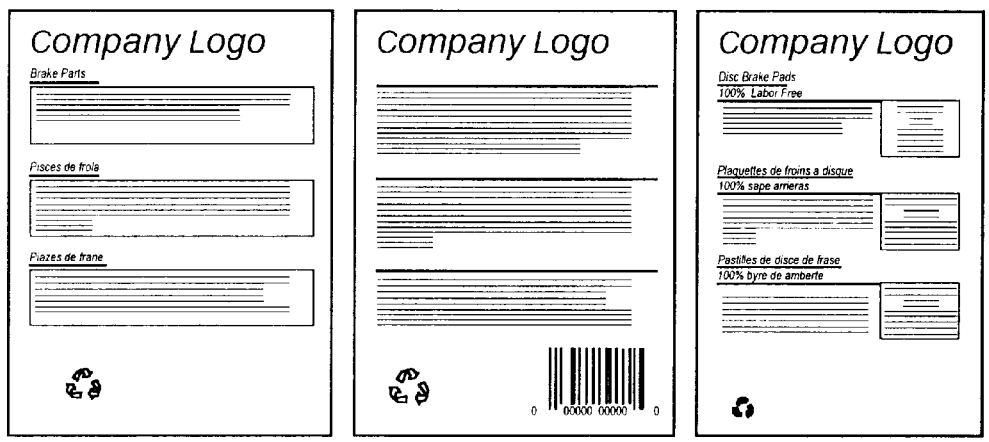
FIG. 14 is a diagrammatic view showing back panel elements.

Referring to FIG. 14, the system of the present invention may provide back panel elements carried by the back panel of the template selected. These elements may be "locked" or may be modified using the drawing program.

Figure 15:
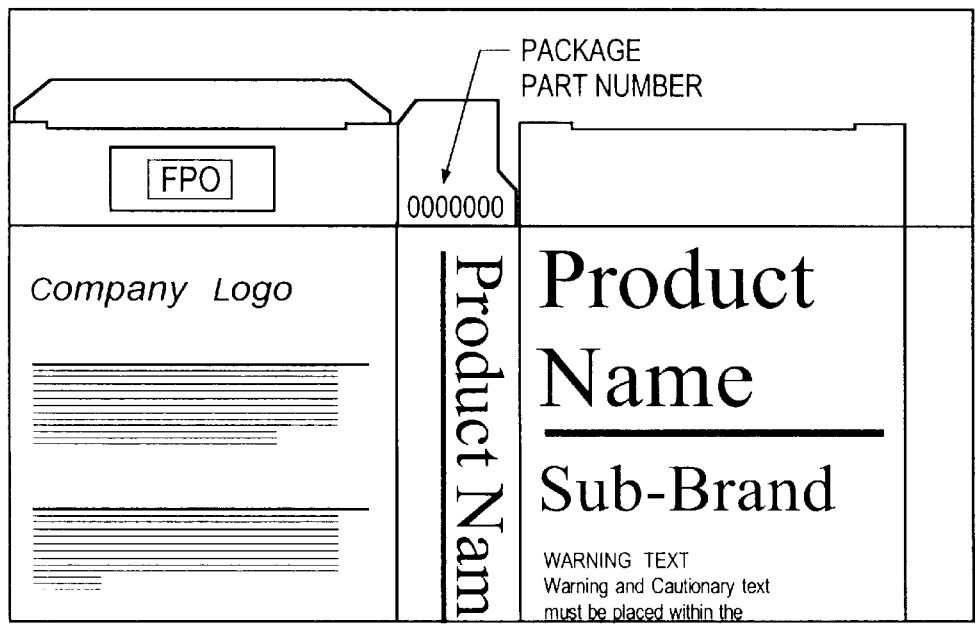
FIGS. 15, 16, and 17 are diagrammatic views showing other graphical elements of a package.
Figure 16:
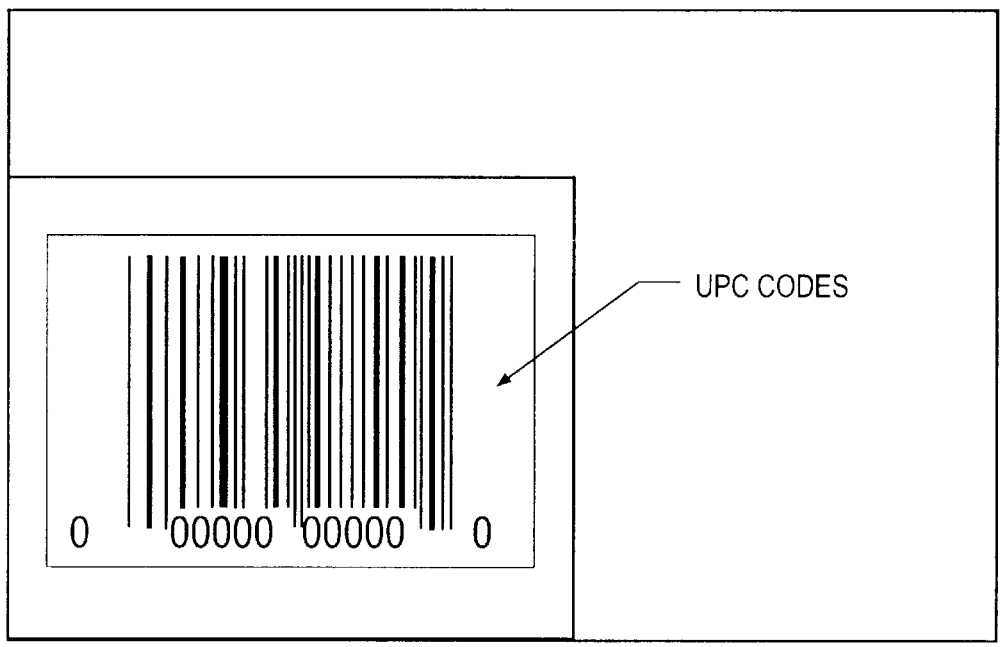
Figure 17:
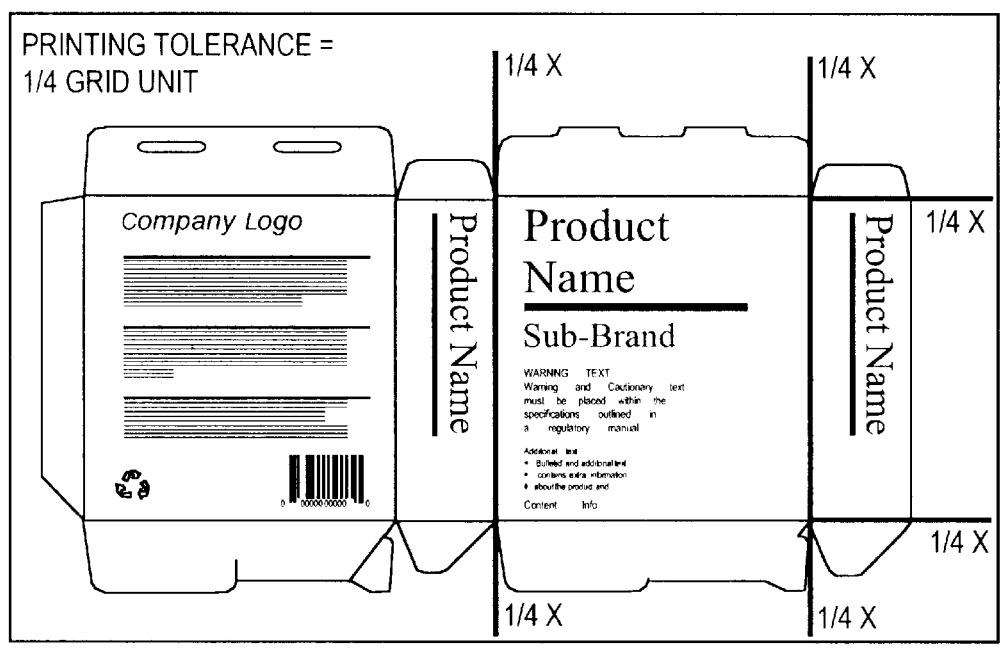

FIGS. 15, 16 and 17 show other graphical elements which may be provided by the system of the present invention and which may be modified using the drawing program if desired.

Figure 18:
FIG. 18 is an illustration of a completed package ready for output.
Figure 19:
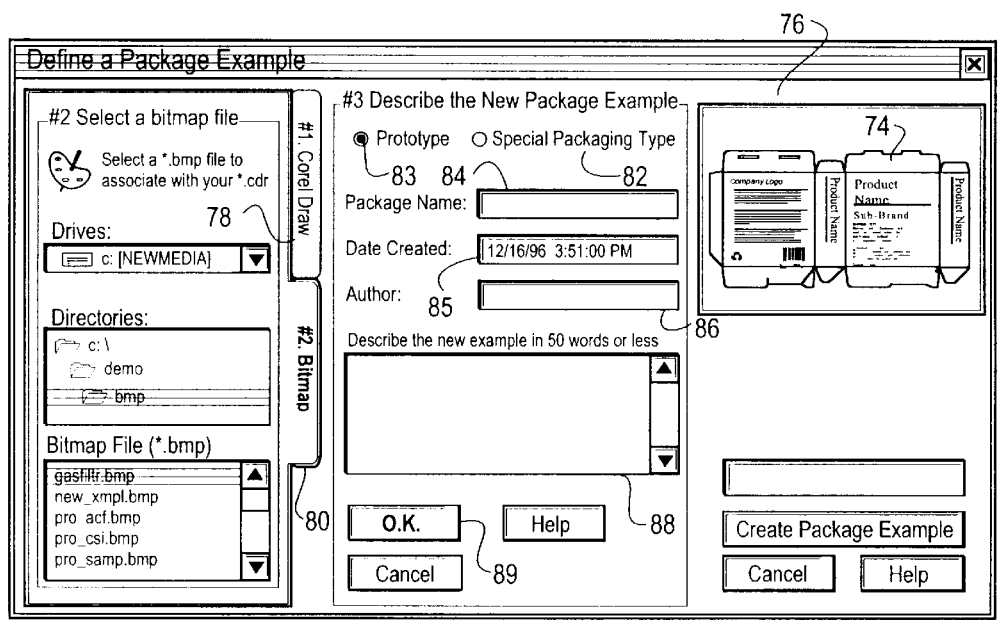
FIG. 19 is a screen shot of a define a package example display.

In FIG. 18, the output package 74 is shown. This output package 74 can be inputted into a package database. To this end, referring to FIG. 19, a "define a package example" screen 76 is illustrated. The output package 74, which has been created in the drawing program 30, is saved as a bitmap (*.bmp) and a vector file (*.cdr) and given a name such as "gasfiltr.bmp" and "gasfiltr.cdr". Referring to FIG. 19, the gasfiltr.bmp file is selected to associate with the gasfiltr.cdr and is imported into the package examples database. Screen 76 has a Corel Draw tab 78 and a bitmap tab 80 as illustrated. It also has a "describe the new package example" area 82 in which the user can indicate whether the package example is a "prototype" or a "special packaging type". In the illustrative embodiment, the "prototype" 83 has been selected. A window 84 is provided for inputting a package name; the instant date and time are set forth in window 85 and a window 86 is provided for inputting the author of the package. Another window 88 is provided for a description of the package example. Once the information is provided in area 82, the user can click on to the OK button 89. In this manner, the output package 74 and its associated description will be entered into the package examples database.

Figure 20:
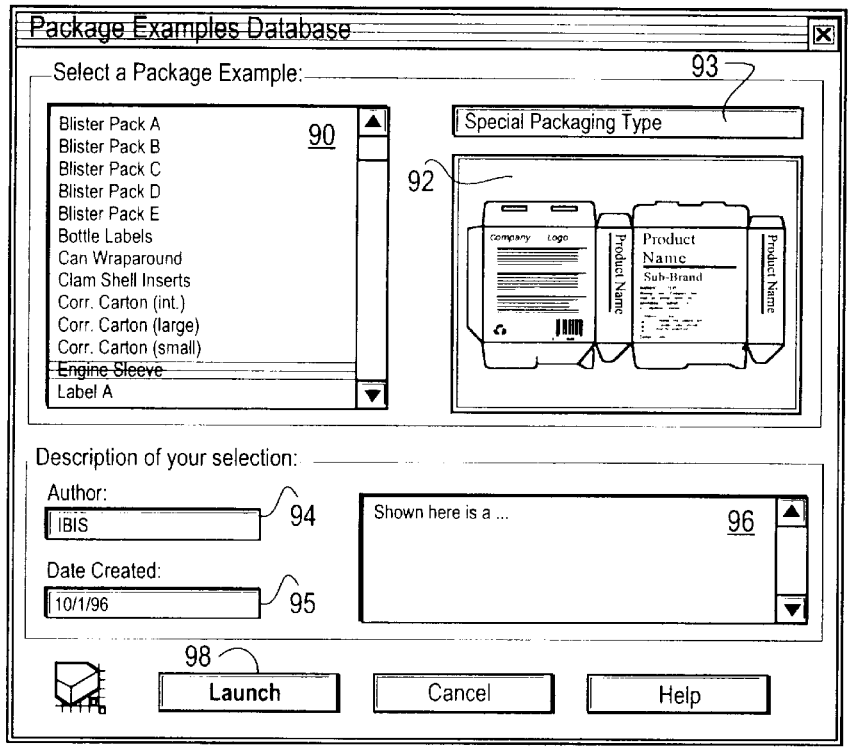
FIG. 20 is a screen shot of a package examples database display.

FIG. 20 illustrates the screen presentation of a package examples database constructed in accordance with the principles of the present invention. It is seen that a window 90 is provided, presenting a listing of the package examples. When a selection is made by the user, the package selected will be illustrated in window 92, its description (whether a "prototype" or a "special packaging type" will be listed in window 93, the author will be listed in window 94, the date created in window 95 and the description will be set forth in window 96.

Modifications to the packages can be made using the drawing program 30. To this end, a package example listed in window 90 is selected and the user then clicks on to launch button 98. This will launch the package example into the drawing program 30, allowing the user to modify the graphics using the drawing program.

Figure 21:
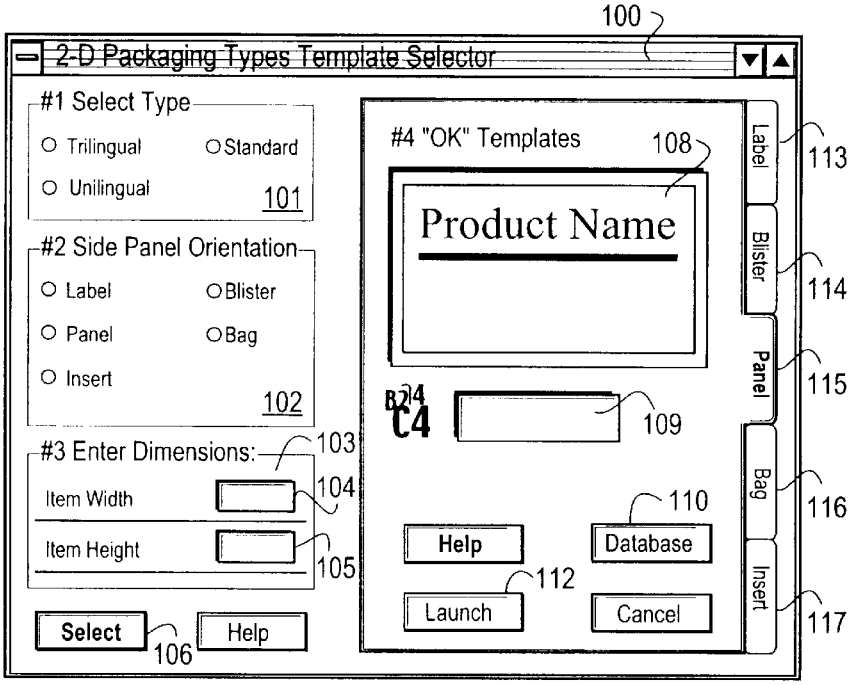
FIG. 21 is a screen shot of a two-dimensional packaging-types template selector display.

In another embodiment of the invention, a two dimension packaging-type template selector 100 is illustrated in FIG. 21. Selector 100 has a select-type area 101 similar to area 46 of the carton template selector of FIG. 8. It also presents a packaging-type area 102 allowing the selection of the type of packaging such as a label, panel, insert, blister or bag. An entered dimensions area 103 is also provided so that the user can input the item width into window 104 and the item height into window 105. Once this information is inputted, the user can click on select button 106 and the panel of an automatically selected template will be presented in window 108. The designation of the template will be presented in window 109 and this template can be entered into a template database by clicking on database button 110 or can be launched into the drawing program 30 by clicking on launch button 112.

Template selector 100 also includes user selective tabs for selecting label via label tab 113, blister via blister tab 114, panel via panel selector tab 115, bag via bag selector tab 116 and insert via insert selector tab 117. In this manner, the user may select an appropriate predefined template for a two-dimensional packaging-type based on the measurements of the packaging-type.

Figure 22:
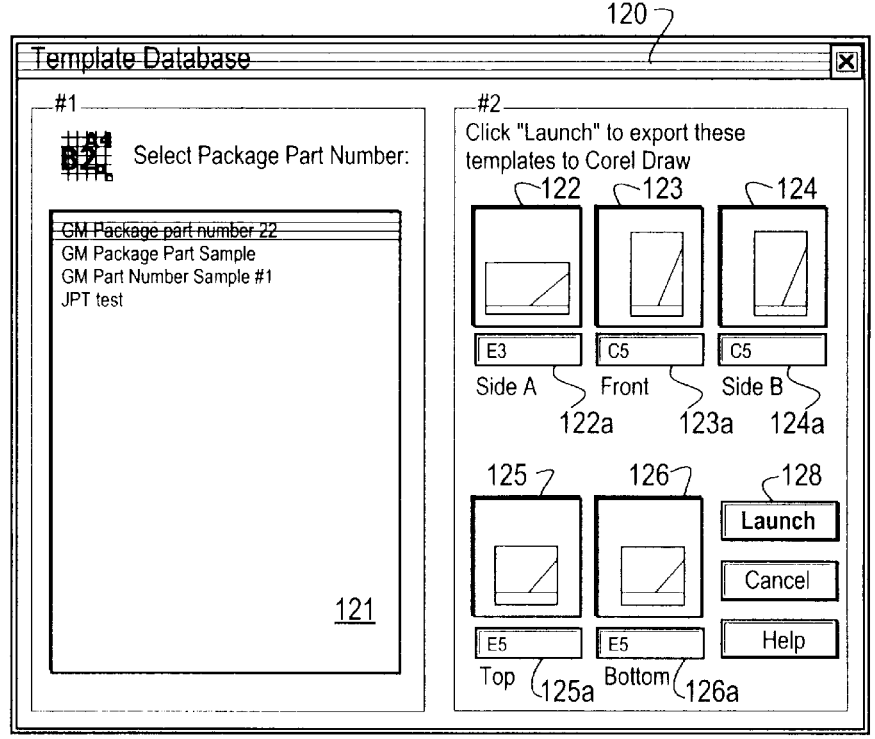
FIG. 22 is a screen shot of a template database display.

A screen shot of the template database is presented in FIG. 22. Referring to FIG. 22, it can be seen that the presentation on display 14 comprises a "template database" 120 having a window 121 in which there is a list of the package part numbers. These are the package part numbers that were entered in windows 68 from the carton template selector of FIG. 8. When one of the part numbers listed in window 121 is on screen selected by the user, the package will be displayed in windows 122, 123, 124, 125 and 126. Window 122 displays side A of the package and window 122a, under window 122, displays the template designation corresponding to the template shown in window 122. Window 123 displays the front panel of the package, and window 123a, below window 123, displays the designation of the corresponding template. Window 124 displays side B of the package and window 124a displays the corresponding template designation. Window 125 displays the top of the package and window 125a displays the corresponding template designation. Window 126 displays the bottom of the package and window 126a displays the corresponding template designation.

Once the desired package has been selected in the template database, the user can click on launch button 128 to launch the templates for the selected package into the drawing program 30. As stated above, using the drawing program, the user can make unlimited modifications to the graphical design, with the system of the present invention providing the examples that can be brought into the drawing program.

Figure 23:
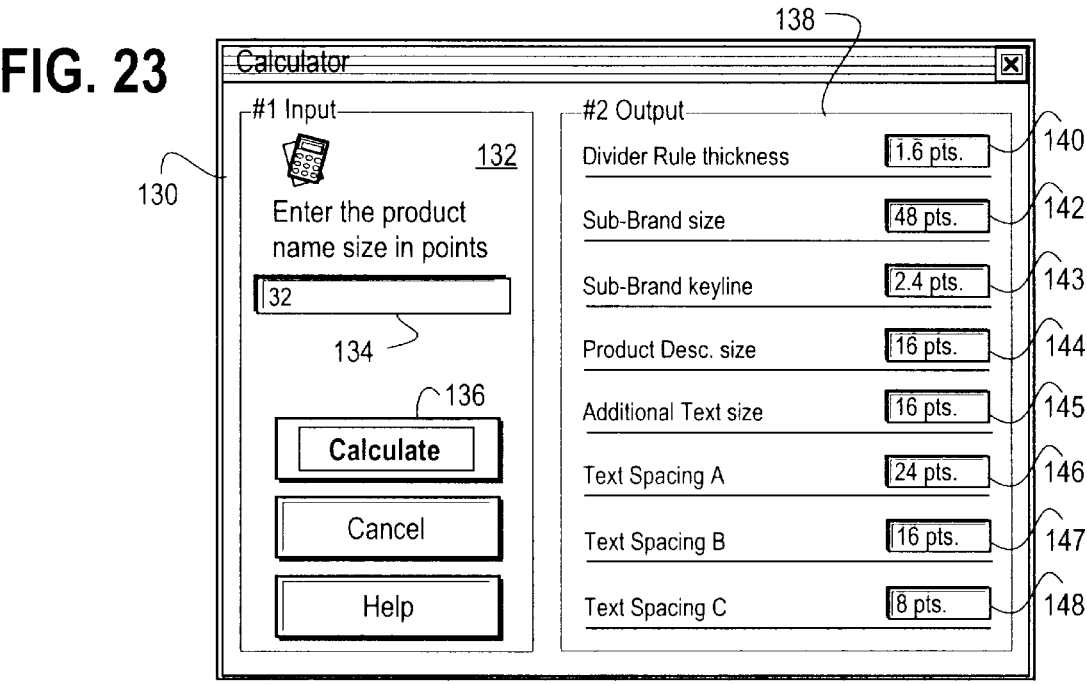
FIG. 23 is a screen shot of a calculator display.

In the illustrative embodiment of the invention, a feature is provided by which relative sizes and spacing are automatically provided based upon inputting a desired "product name" size. Thus, there are predefined sizes of various graphical elements based upon a selected input. Referring to FIG. 23, a screen shot of the calculator 130 is presented. In the input area 132, the user enters, into window 134, the product name size in points. As illustrated in FIG. 23, the number 32, representing a 32 point product name size, has been entered. The user then clicks on calculate button 136 and in the output area 138, there will be presented various sizes and spacing of different graphical elements, which will be automatically calculated by the computer program. For example, the divider rule thickness is programmed to be five percent of the product name size and window 140 presents the divider rule thickness as 1.6 points. The sub-brand size has been programmed to be 1.5 times the product name size and window 142 shows the sub-brand size to be 48 points. Likewise, windows 143, 144, 145, 146, 147, 148 show, respectively, the sizes and spacings, in points, of the sub-brand keyline, the product description size, additional text size, text spacing A, text spacing B and text spacing C. By knowing all of these respective sizes and spacings as calculated, the designer can modify the information and provide graphics that are consistent with predefined sizes and spacing.

Figure 24:
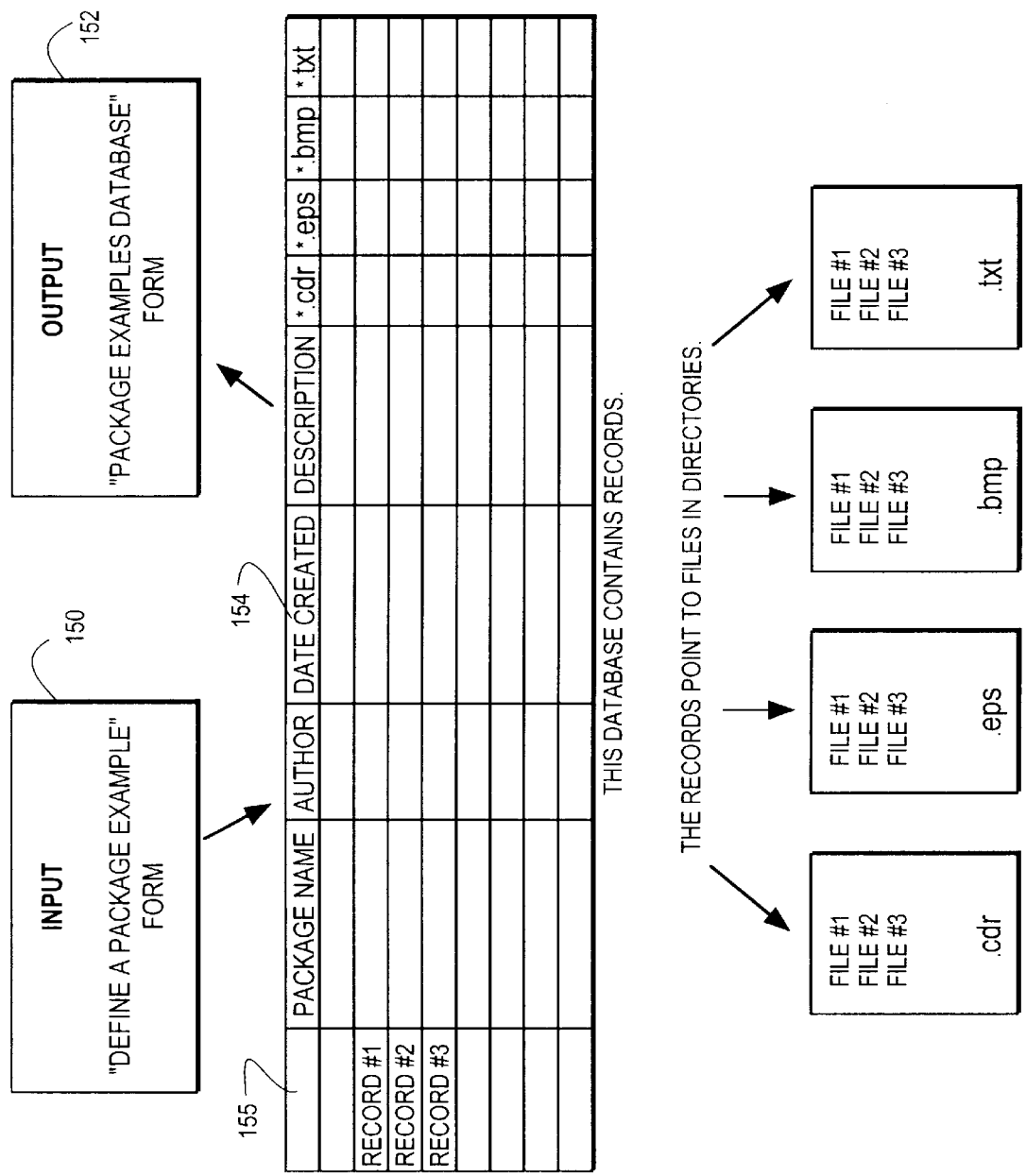
FIG. 24 is a flow diagram of a package examples database.

In accordance with the present invention, there could be a single database containing template shapes, package examples and template selector records. However, for ease in understanding the invention, separate databases will be referred to with the understanding that these databases could be combined if desired. Referring to FIG. 24, the package examples database is illustrated therein. The package examples database of FIG. 24 keeps a record of all finished packages that have been prepared by completing the "define a package example" screen form of FIG. 19. Still referring to FIG. 24, input 150 is the "define a package example" screen form of FIG. 19. Output 152 is the "package example's database" display illustrated in FIG. 20. Database 154 contains a number of records, with each record having the items listed in row 155, including the package name, the author, the date created, the description, and the file format such as .cdr, .eps, .bmp, and .txt. Thus each record corresponds to a finished package.

At the bottom of FIG. 24, there are shown four directories: The .cdr directory, the .eps directory, the .bmp directory, and the .txt directory. Each of these directories contains a number of files. Thus if the user wants to see a gas filter package, he will select the gas filter package and if it is in bitmap form the record for the gas filter package will select the gasfiltr.bmp file from the .bmp directory with respect to the showing of the package, and the text concerning the package will be in the gasfiltr.txt file in the .txt directory.

Figure 25:
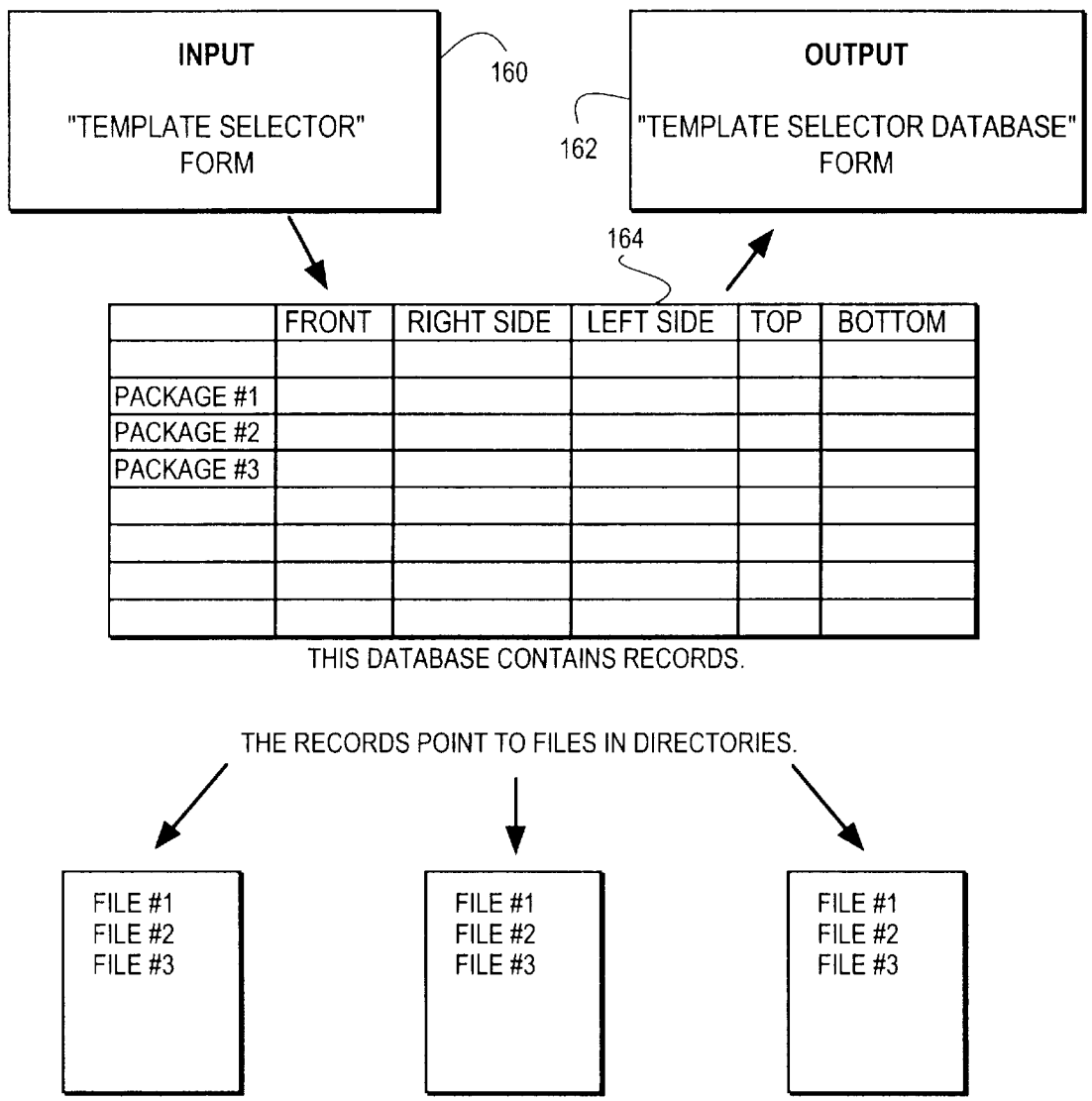
FIG. 25 is a flow diagram of a template selector database.

Referring to FIG. 25, the template selector database is illustrated therein. The input 160 corresponds to the "template selector" screen form of FIG. 8 and the output 162 corresponds to the "template selector database" screen form of FIG. 22. The database 164 contains data concerning each of the packages, including a file showing the front panel, a file showing the right side panel, a file showing the left side panel, a file showing the top panel and a file showing the bottom panel. As illustrated on the bottom of FIG. 25, there is a .cdr directory, a .bmp directory and a eps directory, each containing a number of files. When the user inputs the database, for example by clicking on button 70 of the "carton template selector" screen form of FIG. 8, the data concerning the package will be entered into the appropriate file in the appropriate directory or directories. By inputting to the "template database" screen form of FIG. 22, the appropriate files will be accessed and the panels will be presented in windows 122–126 of the "template database" screen form of FIG. 22.

Although reference has been made to file formats such as .cdr, eps, .bmp and .txt, it is to be understood that these are specific examples of an illustrative embodiment and there is no limitation intended. Other file formats corresponding to different drawing programs, operating systems, etc. can be utilized as desired.

As stated above, FIG. 3 illustrates, in diagrammatic form, templates that are in a template-shape database, with nine in each row and nine in each column in the illustrative embodiment. Of course there could be more or less template shapes as desired. Further, in actual use each template shape would carry graphics thereon, such as a brand name, product name, logo, etc. In the illustrative embodiment, each template is given an alphanumeric identification with each row having the same alphabet character and each column having the same number.

Figure 26:
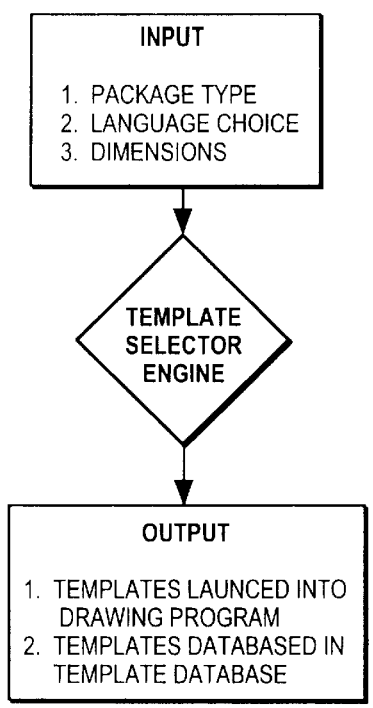
FIG. 26 is a flow diagram of a template selector.
Figure 27:
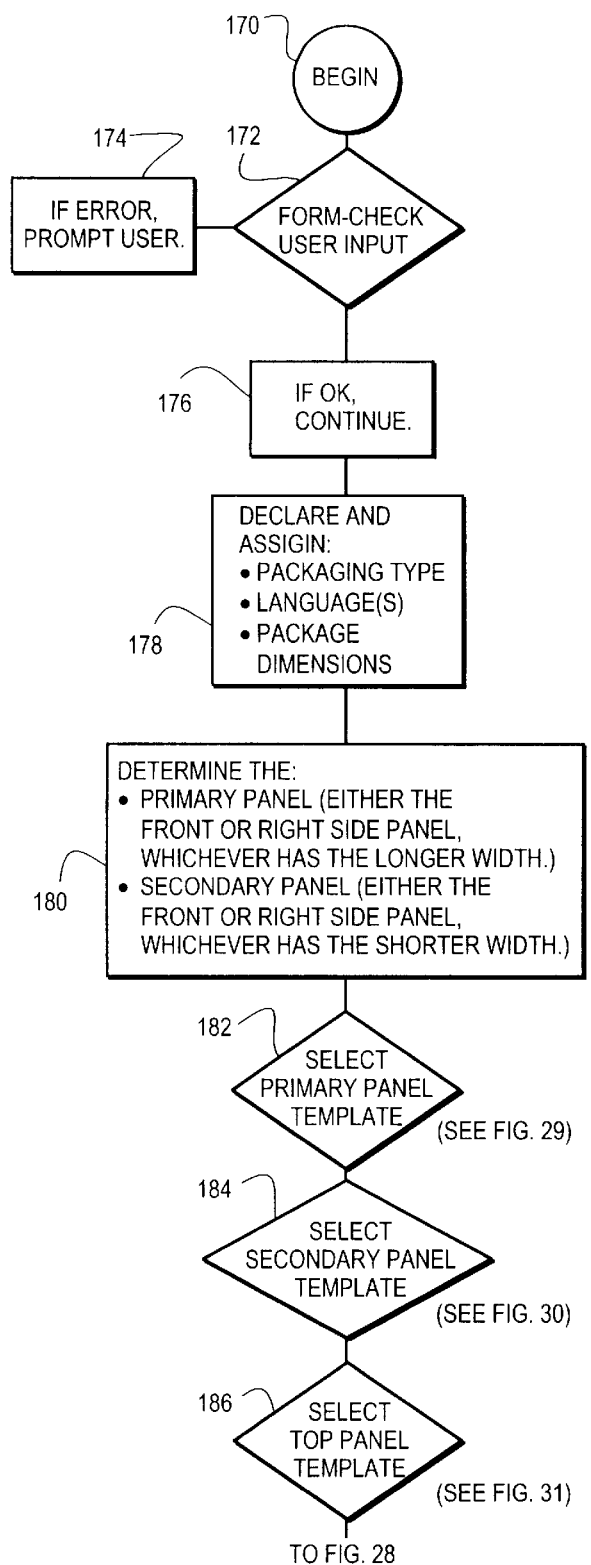
FIGS. 27 and 28, when taken together, are a flow diagram of a template selector engine.
Figure 28:
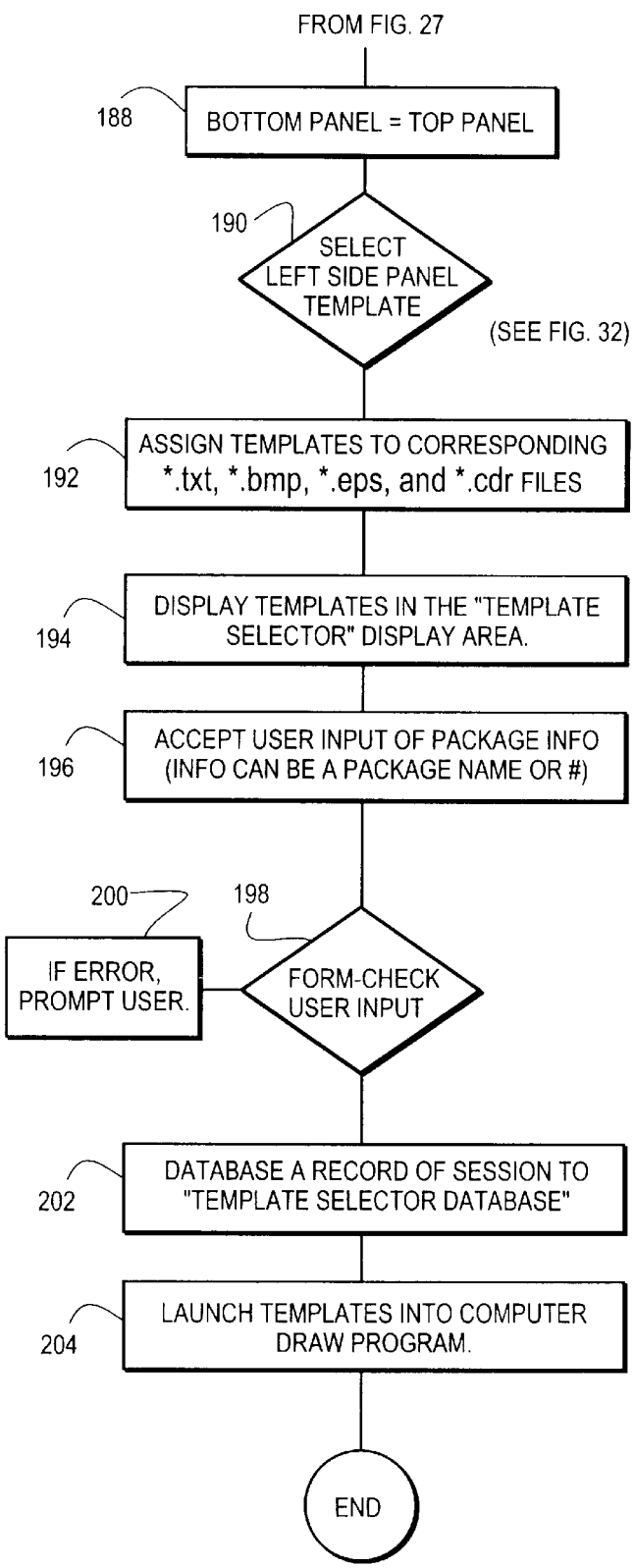

FIG. 26 illustrates the template selector flow chart. This template selector flow chart corresponds to the template selector screen form of FIG. 8. As indicated in FIG. 26, the user-supplied input includes the package type, the language choice and the dimensions, all of which are entered on the screen form of FIG. 8. This is fed to a template selector engine, the flow chart of which is illustrated in FIGS. 27 and 28. The output of the engine results in the templates being launched into the drawing program and/or the templates being databased in the template database.

Figure 29:
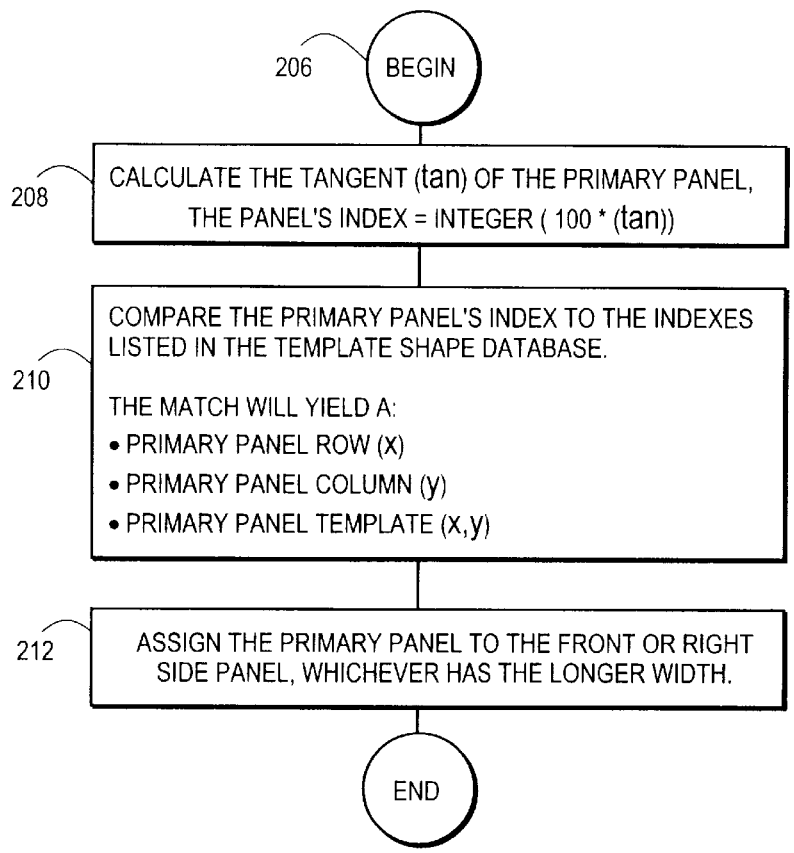
FIG. 29 is a flow diagram of the select primary panel steps.

A flow chart of the template selector engine is presented in FIGS. 27 and 28. Referring to FIG. 27, the engine begins 170 and the computer form checks the user input 172. Thus if the user inputs a word or a character in a numeric box, or if the user makes an error by leaving one of the dimensions blank, the user will be prompted to correct the error 174. If the user input is satisfactory, the system will continue 176. The system will set the variables up 178 based on the user's input. It will thus declare and assign the packaging type, the language and the package dimensions, based on the user's input. The system then determines the primary panel and the secondary panel 180. The determination of the primary panel is either the front or the right side panel, whichever has the longest width. The other panel will be the secondary panel. Other methods for determining the primary panel versus the secondary panel may be used as desired. In the specific example herein, the system compares the front and side panels and determines which has the longest width; the one with the longest width becomes the primary panel while the other becomes the secondary panel. Once this is determined, the system selects the primary panel template. A flow chart of selecting the primary panel template is illustrated in FIG. 29 and is discussed below.

Figure 30:
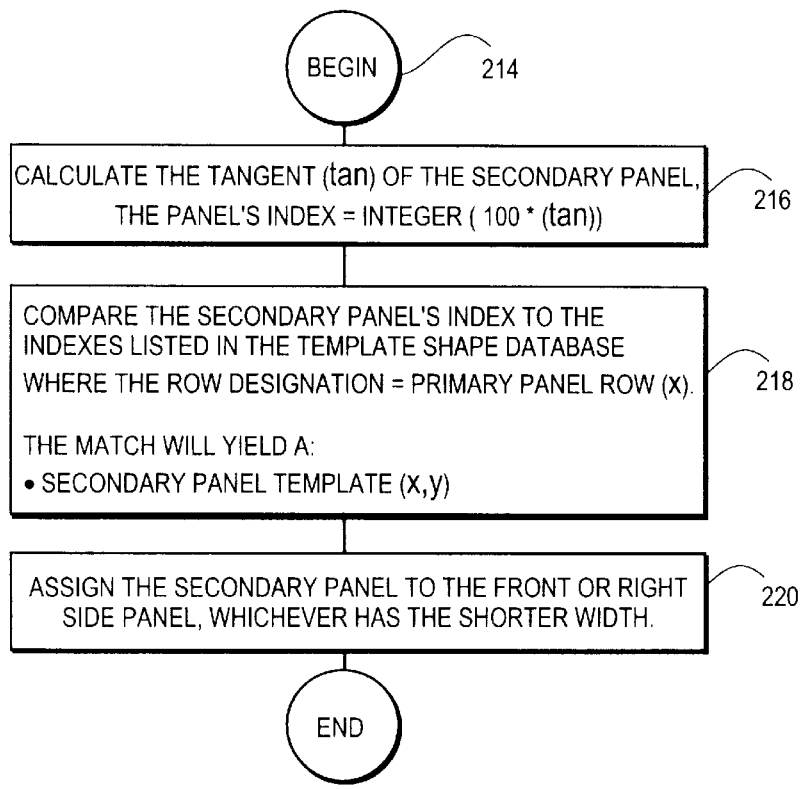
FIG. 30 is a flow diagram of the select secondary panel steps.

After the primary panel template is selected, the secondary panel template is selected 184. A flow chart illustrating the selection of the secondary panel is illustrated in FIG. 30, discussed below.

Figure 31:
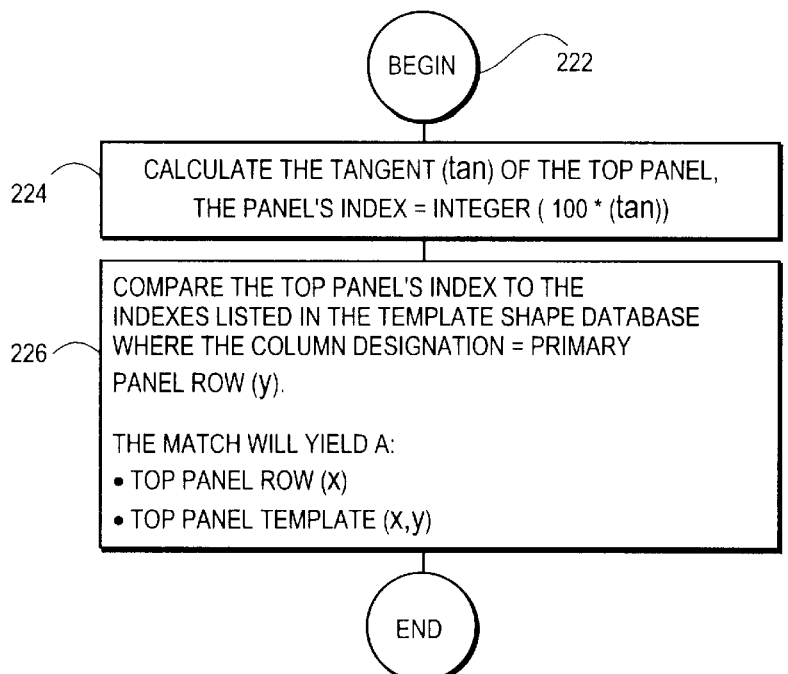
FIG. 31 is a flow diagram of the select top panel steps.

Once the secondary panel template is selected, the top panel template is selected 186. A flow chart of the selection of the top panel template is illustrated in FIG. 31, discussed below.

Figure 32:
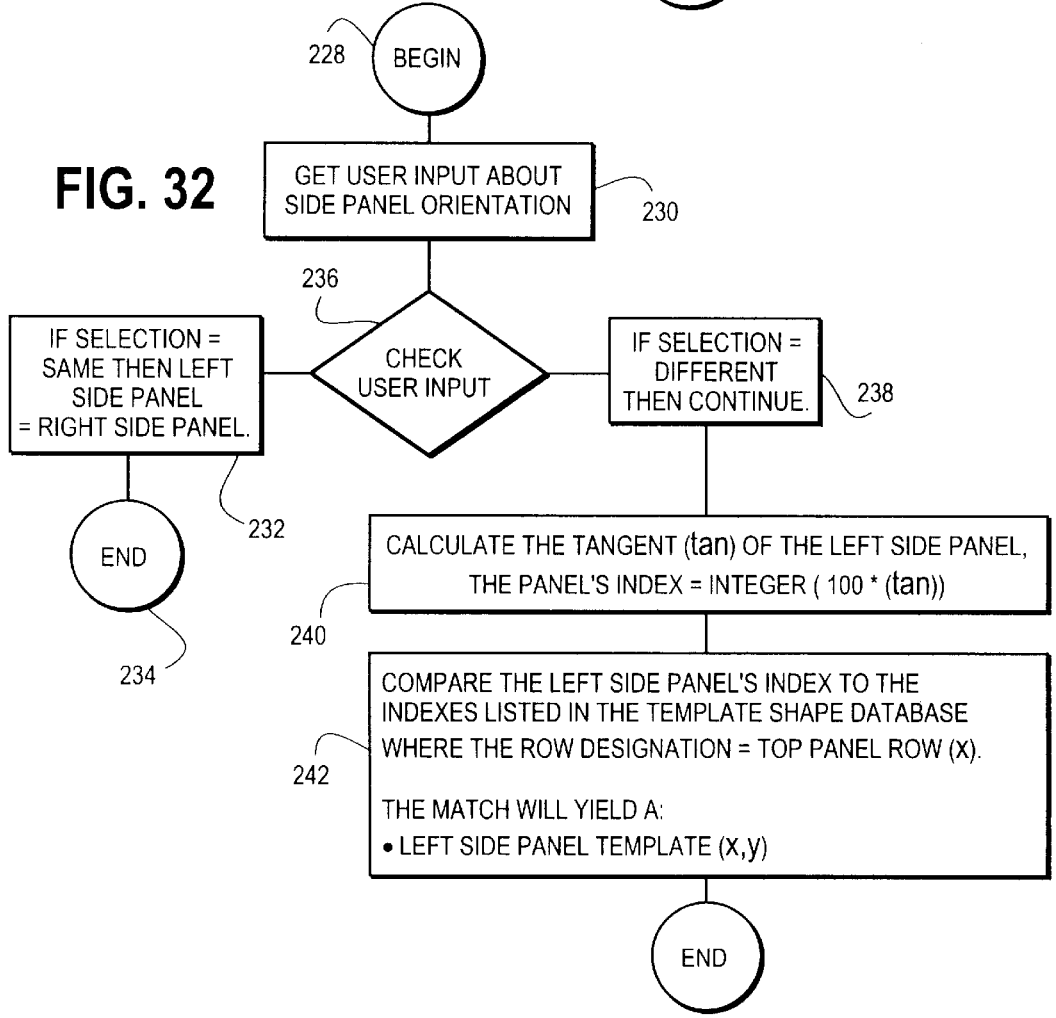
FIG. 32 is a flow diagram of the select left side panel steps.

Now referring to FIG. 28, in the illustrative embodiment the bottom panel is equal to the top panel 188. The left panel template is then selected 190 and a flow chart illustrating the selection of the left side panel template is illustrated in FIG. 32, discussed below.

Still referring to FIG. 28, once all of the templates are selected the system assigns to the templates the corresponding text, bitmap and drawing files 192. In this manner, every template automatically has a corresponding text file, bitmap file, eps file and .cdr file. The text file contains the alphanumeric designation for the template, the bitmap file contains a bitmap picture to represent on the screen, and the .eps and the .cdr files are what goes into the drawing (vector artwork) program, such as Adobe Illustrator or Corel Draw. As stated above, there is no limitation with respect to the type of drawing programs that could be used or with respect to the type of file formats that could be used.

Still referring to FIG. 28, the next step is to display the templates in the template selector display area (see FIG. 8). The system then can accept 196 the user input of the package information such as a package part number. There is another form check 198 so that if the user-inputted information is erroneous, the user will be prompted 200 to correct the input. This could be company specific; if the company requires that all of its parts numbers be two digits, then a dash and then 10 digits and the user inputs something else, the user will be prompted to correct the error. The next step can be the databasing 202 of a record of the session to the "template selector database", which step results from clicking on to database button 70 in FIG. 8. Or, the templates could be launched 204 into the computer drawing program by clicking on to the launch button 72 on the screen form of FIG. 8.

In order to understand the automatic selection of the panels by the computer, reference is first made to the template shape database of FIG. 3. For example, referring to template B2—if B2 is the front panel the system recognizes that the side panel has to be in row B in that the design has to "wrap"; it has to be the same height. The system also recognizes that the top panel must be in column 2 because the width has to wrap around the top and bottom also. The system recognizes that the top and bottom are the same. Thus for every step along the way not only does the system obtain a template for that panel but it also obtains either a row or column for another template on the package.

Now referring to the select primary panel flow chart of FIG. 29, after beginning 206, the system calculates the tangent of the primary panel 208 and provides a panel index which is equal to an integer that is 100 multiplied by the tangent. Thus referring to FIG. 29, assume that the dimensions entered by the user in the template selector screen form for the front panel width and front panel height substantially correspond to template A6. The program contains an algorithm which provides a panel index based on the entered width and height. The algorithm effectively "inserts" a diagonal 209 from the top left dimension point to the bottom right dimension point, determines angle x, and determines the tangent of angle x. The tangent is multiplied by 100 to create a "panel index." Once the panel index is derived, it will be compared to the indexes listed in the template shape database 210. The match will yield a primary panel row, a primary panel column and a primary panel template which is at the intersection of the primary panel row and primary panel column. The system will then assign the primary panel to the front or right side panel, whichever has the longest width 212.

It is to be understood that using a tangent algorithm is only one of a large number of ways of selecting the template and that there are numerous other ways in accordance with the present invention for using the relationship of the width to the height to determine a number or characteristic that enables the selection of a corresponding template. Thus anything that can create a relationship of the width to the height may be utilized as desired.

A flow chart for the selection of the secondary panel is set forth in FIG. 30. After the system begins, the tangent of the secondary panel is provided to derive a panel index 216. As with the selection of the primary panel, an algorithm is provided for calculating the tangent of the secondary panel and then multiplying that tangent by 100. The system will then compare the secondary panel's index to the indexes listed in the template shape database 218. However, the match has to be in the same row as the primary panel row as indicated in the flow chart box 218. The match will yield a secondary panel template. The secondary panel is then assigned to the front or right side panel, whichever has the shorter width 220.

Now referring to FIG. 31, a flow chart of the selection of the top panel is illustrated. After the system begins 222, the algorithm operates to calculate the tangent of the top panel and multiply that tangent by 100 to obtain the panel's index 224. The system then compares the top panel's index to the indexes listed in the template shape database 226. However, the column designation must be the same as the primary panel column. The match will yield a top panel row and a top panel template.

Now referring to FIG. 32, a flow chart for selecting the left side panel is presented. After beginning 228, the system obtains the user input about the side panel orientation 230. Referring to FIG. 12, it is seen that the user could select either the same or different side panel orientation in area 48. If the user selects the same, then the left side panel is the same as the right side panel 232 and the selection will end 234. On the other hand, if the user input is checked 236 and the selection is a different side panel orientation 238, then the system continues. Again the tangent of the left side panel is calculated and multiplied by 100 to form the panel's index 240. Then the left side panel's index is compared to the indexes listed in the template shape database 242. However, the row designation must be the same as the top panel row. The match will yield a left side panel template.

Again referring to FIG. 3, if the primary panel is B2 and the secondary panel has to be in row B, it could be B6. If the top panel is F2, the side panel (with different orientation) would be from row F, probably template F1 or F3 to obtain the proper wrap.

FIGS. 33A–33E comprise a sample printout of a combined database containing all of the subjects. In the topic code column, the "GUI" refers to the topics that are in the guideline section of the system of the present invention. The code "PRO" refers to the prototypes that are in the package examples database and the "SPT" code refers to the standard packaging types that are in the package example database. The "STS" codes refer to the standard language templates and it can be seen that the 81 shapes from FIG. 3 are listed. The "TTS" codes refer to the trilingual language and the "UTS" are the unilingual, with all 81 templates being listed in each of these. The "TUT" code refers to the tutorial elements. It is to be understood that all of these elements in the database are examples and can be varied in accordance with the desires of the programmer and the user.

It can be seen that a novel system and method have been shown that enables the automatic configuration of labels, graphics, printed matter, etc. for packages based upon a user's input of the dimensions for the package, and operation of a drawing program by the user. Using the system and method of the present invention, it is extremely easy for the designer to select the correct, predesigned graphics for panels on a package. In this manner, regardless of the size, shape or the type of the package, the finished product can easily and quickly be designed having a basic style with consistent graphics.

Although illustrative embodiments of the invention have been shown and described, it is to be understood that various modifications and substitutions may be made by those skilled in the art without departing from the novel spirit and scope of the invention.

What is claimed:

1. A method for applying graphics to packaging and/or labels using an interactive computer operated by a user, which comprises the steps of:

providing a database containing graphic files with the graphic files including template shapes corresponding to portions of the package or label, said template shapes carrying predesigned graphics;

providing a drawing program;

providing a template selector;

user-inputting size information to the template selector;

automatically selecting predesigned graphic templates from said database in response to said user-inputting step;

launching said automatically selected graphic templates into said drawing program; and user-operating said drawing program to manipulate the graphics to provide a package or label.

2. A method as defined in claim 1, in which said predesigned graphics include a brand name and a product name.

3. A method as defined in claim 1, including the step of storing the selected graphic template with a package name for future reference.

4. A method as defined by claim 1, in which the template selector shows a two-dimensional picture of a selected template and including the step of providing user operation of selective showing of the front of a selected template, a side of a selected template, the top of a selected template, and the bottom of a selected template.

5. A method as defined by claim 1, in which the template selector comprises a carton template selector and the user-inputting step comprises entering dimension information concerning the carton and viewing two-dimensional graphics of the selected carton.

6. A method as defined in claim 5, in which the two-dimensional graphics of the selected carton are viewed by user-selecting the portion of the carton to be viewed.

7. A method as defined in claim 6, in which the step of user-selecting the portion of the carton to be viewed includes the step of selecting tabs corresponding to the front, side, top and bottom of the carton.

8. A method for applying graphics to packaging and/or labels using an interactive computer operated by a user, which comprises the steps of:

providing a database containing graphic files with the graphic files including templates shapes corresponding to portions of the package or label, said template shapes carrying predesigned graphics;

providing a drawing program;

importing a die into said drawing program;

measuring said die;

formatting said die;

providing a template selector;

user-inputting information to the template selector;

automatically selecting predesigned graphic templates from said database in response to said user-inputting step;

launching said automatically selected graphic templates into said drawing program, said launching step including launching said automatically selected graphic templates to overly said die in said drawing program; and user-operating said drawing program to manipulate the graphics to provide a package or label.

9. A method as defined in claim 8 including the step of storing the selected graphic templates with a package name for future reference.

10. A method for applying graphics to packaging and/or labels using an interactive computer operated by a user, which comprises the steps of:

providing a database containing graphic files with the graphic files including template shapes corresponding to portions of the package or label, said template shapes carrying predesigned graphics;

providing a drawing program;

providing a template selector;

user-inputting information to the template selector;

automatically selecting predesigned graphic templates from said database in response to said user-inputting step;

launching said automatically selected graphic templates into said drawing program;

user-operating said drawing program to manipulate the graphics to provide a package or label;

said template selector comprising a carton template selector and the user-inputting step comprising entering dimension information concerning the carton and viewing two-dimensional graphics of the selected carton, said two-dimensional graphics of the selected carton being viewed by user-selecting the portion of the carton to be viewed including the step of selecting tabs corresponding to the front, side, top and bottom of the carton.

11. An interactive computer system for applying graphics to packaging and/or labels using an interactive computer operated by a user, which comprises:

a database containing graphic files with the graphic files including template shapes corresponding to portions of the package or label, said template shapes carrying predesigned graphics;

a drawing program;

a template selector adapted for receiving information inputted by a user;

said computer being operable for automatically selecting predesigned graphic templates from said database in response to the user input, with the user being able to launch said automatically selected graphic templates into said drawing program and the user being able to operate said drawing program to manipulate the graphics;

said template selector including a window for entering width and height dimensions;

said template selector including means for selecting the language of the graphical copy, means for entering the dimensions of the package, means for viewing a portion of the package, and means for selecting a portion of the package to be viewed;

said means for selecting the portion of the package to be viewed comprising tabs for selecting the front or side or top or bottom of the package.

12. An interactive computer system for applying graphics to packaging and/or labels using an interactive computer operated by a user, which comprises:

a database containing graphic files with the graphic files including template shapes corresponding to portions of the package or label, said template shapes carrying predesigned graphics;

a drawing program;

a template selector;

means for user-inputting information to the template selector including means for entering dimensions of the package;

computer-operated means for automatically selecting predesigned graphic templates from said database in response to the user inputs;

means for viewing a portion of the package;

means for selecting a portion of the package to be viewed, said selecting means comprising tabs for selecting the front or side or top or bottom of the package;

means for launching said automatically selected graphic templates into said drawing program;

means for user-operating said drawing program to manipulate the graphics to provide a package; and means for adding the selected package to a package example database.

* * * * *